United States Patent
Fujiwara et al.

(10) Patent No.: US 6,847,685 B1
(45) Date of Patent: Jan. 25, 2005

(54) SHUFFLING DEVICE, CODING DEVICE, DECODING DEVICE OF VIDEO SIGNAL AND MEDIUM RECORDING THE PROGRAMS OF SHUFFLING, CODING AND DECODING

(75) Inventors: Yuji Fujiwara, Hyogo (JP); Masakazu Nishino, Osaka (JP); Mitsuhiro Miyashita, Hyogo (JP); Kazuhiro Wake, Osaka (JP); Seiichi Takeuchi, Osaka (JP); Keishi Okamoto, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 765 days.

(21) Appl. No.: 09/589,800

(22) Filed: Jun. 8, 2000

(30) Foreign Application Priority Data

| Jun. 8, 1999 | (JP) | 11-160513 |
|---|---|---|
| Jun. 8, 1999 | (JP) | 11-160590 |
| Jun. 18, 1999 | (JP) | 11-172043 |
| Nov. 30, 1999 | (JP) | 11-341023 |

(51) Int. Cl.⁷ .............................. H04N 7/12; H04N 7/64
(52) U.S. Cl. ................... 375/240.16; 386/116; 386/124
(58) Field of Search ................... 375/240.16; 348/448, 348/556, 441, 558; 386/34, 40, 45, 116, 124, 125, 126; H04N 7/12, 7/64

(56) References Cited

U.S. PATENT DOCUMENTS

| 5,550,640 A | * | 8/1996 | Tsuboi et al. ................. 386/35 |
| 5,557,479 A | | 9/1996 | Yanagihara |
| 5,581,310 A | * | 12/1996 | Vinekar et al. ............. 348/718 |
| 5,646,695 A | * | 7/1997 | Fujiwara et al. ............ 348/448 |
| 5,699,475 A | * | 12/1997 | Oguro et al. ................ 386/109 |
| 5,781,690 A | * | 7/1998 | Juri et al. .................... 386/111 |
| 5,905,839 A | * | 5/1999 | Yanagihara et al. .......... 386/26 |
| 5,909,240 A | * | 6/1999 | Hori ............................. 348/78 |
| 6,332,042 B1 | * | 12/2001 | Kondo et al. ............... 382/239 |
| 6,505,299 B1 | * | 1/2003 | Zeng et al. ................. 713/160 |

FOREIGN PATENT DOCUMENTS

| EP | 0 554 871 A | 8/1993 |
| JP | 06153151 | 5/1994 |
| WO | WO 99/21369 | 4/1999 |

OTHER PUBLICATIONS

European Search Report for EP 00 11 2297, dated Apr. 16, 2004.

* cited by examiner

*Primary Examiner*—Nhon Diep
(74) *Attorney, Agent, or Firm*—RatnerPrestia

(57) ABSTRACT

A video signal shuffling device forms a segment with blocks having a given offset value in horizontal and vertical directions from a given starting point uniquely determined on the screen, the offset value being identical in every region. The segment is formed in a unit of one frame or two frames. The shuffling device divides one frame comprising blocks into a plurality of regions. A coding device determines a final priority as well as a final quantizer thereby quantizing a segment and providing the segment with a variable-length-coding based on a first priority, coding-quantity obtained from a plurality of quantizers, second priority and a quantizer. A coding device and its decoder, the coding device carries out a hierarchical coding by only a motion vector in a compressed stream at a lower resolution side and by agreeing a motion detected and a DCT block size with a size on the screen.

28 Claims, 27 Drawing Sheets

SHUFFLING DEVICE, CODING DEVICE, DECODING DEVICE OF VIDEO SIGNAL AND MEDIUM RECORDING THE PROGRAMS OF SHUFFLING, CODING AND DECODING

FIELD OF THE INVENTION

The present invention relates to a shuffling device, coding device and decoding device of video signals as well as a medium recording the programs of shuffling, coding and decoding. More particularly, the present invention relates to the following subjects:

(1) a shuffling device relating to television (TV) signals in the formats of high-definition TV (HDTV) and progressive method, and a medium recording the program of the shuffling (2) a coding device relating to controlling a quantity of codes generated in a segment, and a medium recording the program of the coding (3) a coding device and an decoding device relating to hierarchical coding in a direction of spatial coordinates standardized by Motion Picture Experts Group (MPEG).

BACKGROUND OF THE INVENTION

Regarding the first subject, a shuffling method is one of high-efficient-coding methods for recording standard TV (SDTV) signals into a compressed-digital type videocassette-recorder (VCR). This shuffling method unifies lengths of video signal data in a coding unit.

To be more specific, the shuffling method combines a plurality of blocks displayed apart from each other on a screen, thereby forming a segment, i.e. one unit of coding. As a result, correlations between data within a segment become loose, thereby preventing the data lengths in respective segments from being dispersed. This can prevent picture quality from being locally deteriorated.

The details of shuffling method depend on a number of sampling of input-digital-video signals, a recording rate, and the like.

For instance, when a SDTV signal is down-sampled to a 4:1:1 signal and recorded in 25 Mbps, one frame data is divided into 270 segments.

When a 4:2:2 signal is recorded, one frame data is divided into 540 segments.

On the other hand, a TV signal of higher quality than the SDTV or a TV signal of the progressive format has been recently recorded in 100 Mbps on trial. This method tries to double the recording rate since those signals have a higher data rate than that of the SDTV. In other words, a recorded rate is changed from a data rate of an input video signal, the methods discussed above cannot be used as they are, and they must be expanded or modified.

Regarding the second subject, FIG. 21 is a block diagram of a conventional video-signal-device relating to a control method of code-quantity. This prior art case is described under the following condition.

Two types of quantizers are used, and two quantizing numbers specifying quantizing steps are available, i.e. "0" and "1". Respective quantizers are named "quantizer 0" and "quantizer 1" (not shown). The greater number has the smaller quantizing step-sizes.

When identical orthogonal-transformed-data undergo a quantizing and a variable length coding, a greater code-quantity is produced in quantizer 1 and a smaller code-quantity is produced in quantizer 0.

Each block has priority 0 and priority 1, and offset value 0, offset value 1 corresponding to priority 1, priority 0.

The conventional coding device is described with reference to FIG. 21.

Segment creator 91 divides an input video signal into blocks, e.g. a block formed of 8 pixels×8 lines, and forms a segment, which is a control unit of code-quantity, with 20 blocks. Each segment is fed into orthogonal transformer 92 and priority calculator 93.

Orthogonal transformer 92 provides each segment with an Orthogonal transforming process block by block, and outputs an orthogonal transform data which is supplied to priority calculator 93, coding section 94 including quantizer 0, coding section 95 including quantizer 1 and coding section 97.

Priority calculator 93 calculates priorities of each block based on the block data supplied and the block data after the orthogonal transforming, then sets priority 0 or priority 1.

The priorities of each block are fed into coding sections 94 and 95, quantizer determining section 96.

Coding sections 94 and 95 add offset values—determined by the priorities—to respective quantizing numbers (the resultant added value is limited by a maximum quantizing number), and quantize the orthogonal transformed data supplied.

In other words, when priority 0 is fed into quantizer 0, the quantizing number is set "0", and when priority 1 is fed into quantizer 0, the quantizing number is set "1". When priority 0 or 1 is fed into quantizer 1, quantizing number is set "1", because the maximum quantizing number is "1", and quantization is carried out. Then variable length coding is carried out before the code-quantity of the block is calculated. The same process is provided to 20 blocks of respective segments to extract code-quantity of each segment.

The code-quantity calculated in coding sections 94 and 95 are fed into quantizer determining section 96.

Quantizer determining section 96 selects a final quantizer dealing with the maximum code-quantity—not more than a target code-quantity—out of the code-quantities of coding sections 94 and 95. The quantizing number of the final quantizer is fed into coding section 97.

Coding section 97 quantizes the orthogonal transformed data with the final quantizer and an offset value determined by a priority, then provides a variable length coding process before outputting a coded data.

In the conventional coding device; however, when a block has a high priority, even a quantizer of the greatest step-size sometimes results in an overflow, i.e. the code-quantity produced in the segment exceeds a target code-quantity.

When an overflow is happened, not all the data are recorded and some of the data are discarded because code-quantity produced in the segment exceeds the code-quantity allotted to the segment.

The coded data in the segment are recorded in a recording medium following the priority order of blocks set in the segment. The data of high-priority blocks are thus entirely recorded; however the data of low-priority blocks are scarcely recorded in the medium.

Priorities of blocks having alternate-current (AC) coefficients exceeding a given value are set "1", and all the AC coefficients of the blocks having priority "1" are divided by "2" so that data volume can be reduced. This method is effective for reducing data volume; however, the AC coefficients of blocks having priority 1 are always divided by "2", i.e. even the quantizer having the smallest step-size is used, the AC coefficients are divided by "2". Thus the code-quantity produced in the segment becomes so less than a target code-quantity that the code-quantity allotted to the segment cannot be efficiently used.

Regarding the third subject, FIG. 28 is a block diagram of a conventional hierarchical coding device for a video signal, and FIG. 29 is a block diagram of a conventional hierarchical decoding device for a video signal.

In FIG. 28, an input video signal is converted by format converter 1001 into a video signal of lower resolution.

Motion detector 1002 records a video signal supplied from converter 1001 into picture memory 1003. Further, detector 1002 detects a motion of each macro-block (a block formed of 16 pixels×16 lines of luminance signal in a screen) by using a coding frame, a reference frame stored in picture memory 1003 and a video signal of a reference frame already coded and decoded.

Motion compensating (MC) device 1004 outputs each differential signal of respective macro-blocks, the differential signal being derived between a video signal of a coded frame and a video signal of the reference frame detected by detector 1002.

Discrete-cosine-transform (DCT) device 1005 provides DCT process to a differential signal in each block (8 pixels×8 lines on the screen) of the output signal supplied from motion compensating device 1004.

Quantizer (Q) 1006 quantizes a DCT coefficient.

Inverse-quantizer (IQ) 1007 inversely quantizes the coefficient quantized by quantizer 1006.

Inverse discrete-cosine-transform (IDCT) device 1008 provides the output from inverse-quantizer 1007 with IDCT process.

Motion compensating (MC) device 1009 adds a decoded video signal of a reference frame to the output from IDCT device 1008, thereby generating a decoded video signal, and stores the signal in picture memory 1003. The reference frame is compensated its motion by compensating device 1004.

Variable length coding (VLC) device 1010 provides an output of quantizer 1006 and a given flag including a motion vector with variable length coding process.

Second format converter 1011 converts the decoded video signal—an output from motion compensating device 1009—into a signal of the same resolution as the input video signal, and stores the signal into picture memory 1013.

Motion detector 1012 records the input video signal into picture memory 1013. Detector 1012 detects a motion of each macro-block by using a coding frame, a reference frame stored in picture memory 1013, a video signal of the reference frame already coded and decoded and another reference frame. This another reference frame is a video signal on the same timing of the low-resolution signal, i.e. an output from second format converter 1011.

Motion compensating (MC) device 1014 outputs each differential signal of respective macro-blocks, the differential signal being derived between a video signal of a coded frame and a video signal of a reference frame detected by motion detector 1012.

Discrete-cosine-transform (DCT) device 1015 provides DCT process to a differential signal in each block of the output signal supplied from motion compensating (MC) device 1019.

Quantizer (Q) 1016 quantizes a DCT coefficient.

Inverse-quantizer (IQ) 1017 inversely quantizes the coefficient quantized by quantizer 1016.

Inverse discrete-cosine-transform (IDCT) device 1018 provides the output from inverse-quantizer 1017 with IDCT process.

Motion compensating device 1019 adds a decoded video signal of a reference frame to the output from IDCT device 1018, thereby generating a decoded video signal, and stores the signal in picture memory 1013. The reference frame is compensated its motion by compensating device 1014.

Variable length coding (VLC) device 1020 provides an output of quantizer 1016 and a given flag including a motion vector with variable length coding process before outputting them.

In FIG. 29, variable length decoder (VLD) 1021 receives a first stream of compressed video signals, and decodes the stream in a given manner then outputs a motion vector and the decoded signal.

Inverse-quantizer (IQ) 1022 provides the decoded signal with inverse quantizing process following the given steps, and outputs a DCT coefficient. IDCT device 1023 provides the DCT coefficient with IDCT process. Motion compensating (MC) device 1024 adds a decoded video signal of a reference frame specified by the motion vector to the output from IDCT device 1023, thereby generating a decoded video signal, and stores the signal in picture memory 1025.

Second format converter 1026 converts the format of a video signal and stores it into picture memory 1031.

Variable length decoder (VLD) 1027 receives a second stream of compressed video signals, and decodes the stream in a given manner then outputs a motion vector (MV) and the decoded signal. Inverse-quantizer (IQ) 1028 provides the decoded signal with inverse quantizating process following the given steps, and outputs a DCT coefficient. IDCT device 1029 provides the DCT coefficient with IDCT process. Motion compensating (MC) device 1030 adds a decoded video signal of a reference frame specified by the motion vector to the output from IDCT device 1029, thereby generating a decoded video signal, and stores the signal in picture memory 1031.

In the conventional coding device discussed above; however has the following problems: (1) Two motion detectors are used, and this complicates the structure of the coding device. (2) Since both of the first stream and the second stream of the compressed video signals include motion vectors, the streams are obliged to have redundancy. (3) The input video signals are in a segment different from that of the low resolution signals on a screen. Thus distortions are crossed and become more conspicuous.

SUMMARY OF THE INVENTION

An object of the present invention is to provide a video-signal-shuffling device and a recording medium including the program of this shuffling program. The shuffling device still uses a conventional concept of a recording apparatus and yet it can expand the method of the conventional apparatus.

Another object of the present invention is to provide a coding device of a video signal and a recording medium including the coding program. The coding device efficiently uses a code-quantity allotted to a segment, improves picture quality and reduces overflows.

Still anther object of the present invention is to provide another coding device of a video signal and a recording medium including the coding program as well as a decoding device and a recording medium including the decoding program. The coding device is formed by a simpler structure, and codes a video signal in a hierarchical manner to prevent distortions due to compression from crossing with each other. The decoding device is structured responsive to the coding device.

The present invention thus concerns the video-signal-shuffling device, video signal coding and decoding devices, and the recording media including those programs as defined in the appended claims.

DESCRIPTION OF THE PREFERRED EMBODIMENTS

The preferred embodiments are demonstrated hereinafter with reference to the accompanying drawings.

Exemplary Embodiment 1

Figure 1:
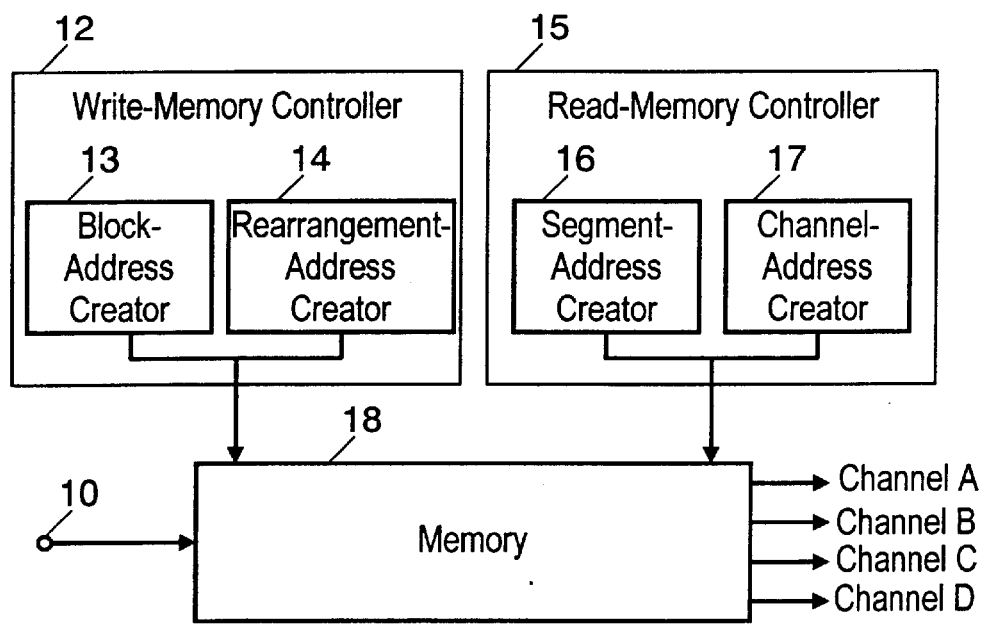
FIG. 1 is a block diagram of a video signal shuffling device in accordance with a first exemplary embodiment of the present invention.

FIG. 1 is a block diagram of a video signal shuffling device in accordance with the first exemplary embodiment of the present invention.

In FIG. 1, a digital video signal received at input terminal 10 is fed into memory 18.

Block-address creator 13 creates addresses for the blocks divided from an input data. Rearrangement-address creator 14 creates addresses for the blocks rearranged in a memory.

Write-Memory controller 12 calculates an address in the memory unique to the input data on the screen through block-address creator 13 and rearrangement-address creator 14, and controls the input data to be written into the unique address in the memory.

Read-Memory controller 15 reads the data from the memory through segment-address-creator 16 and channel-address-creator 17, and outputs the data to a given channel. Segment-address-creator 16 creates a segment based on the data in memory 18, and channel-address-creator 17 creates an address for outputting the segment.

Figure 2:
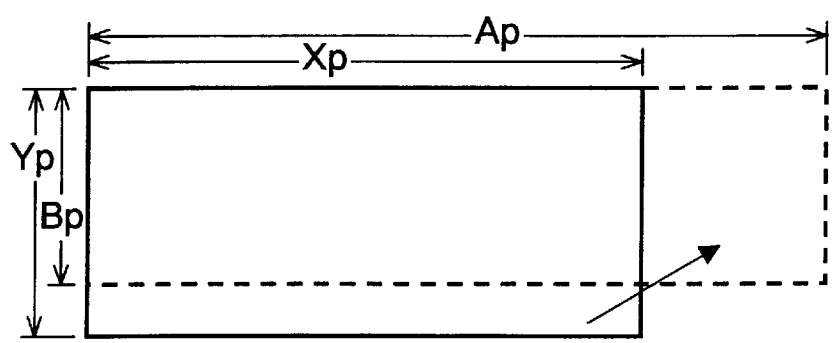
FIG. 2 illustrates how to write data into a memory in accordance with the first embodiment.

FIG. 2 illustrates how to write data into the memory in accordance with the first embodiment. The following description is referred to the case below. An input signal of Xp (numbers of horizontal pixels) and Yp (numbers of vertical lines) is written into a memory region of Ap (numbers of horizontal pixels) and Bp (numbers of vertical lines), where Ap>Xp, Bp<Yp, and Xp×Yp=Ap×Bp are established.

In FIG. 2, solid lines show a pixel region and broken lines show memory 18. The input data cannot be written directly into memory 18 when the screen is in one-to-one correspondence with the memory. Rearrangement-address creator 14 thus creates addresses for the input data to be written by moving a region of Xp×(Yp−Bp) on the screen to a region of (Ap−Xp)×Bp in the memory.

The shuffling process including the rearrangement and segment-formation discussed above are applicable to each block, i.e. a block is the minimum unit to undergo the shuffling process.

Assuming that a block is formed of Kp pixels in horizontal (H) and Kp lines in vertical (V), vertical Yp line has the following relation with respect to the minimum block unit Kp: Yp=Kp×Lp+Kp/2, where Lp is a natural number. In this case, Block-address creator 13 creates an address so that a block formed of 2 Kp pixels (H)×Kp/2 lines (V) is written in the memory.

Read-memory controller 15 reads the data from the memory using segment-address creator 16 and channel-address creator 17. The address to be read out from the memory is created as follows: First, segment-address creator 16 creates the addresses based on segments to be output to respective channels. Channel-address creator 17 creates offset values for respective channels both in horizontal and vertical directions. The offset values are added to the addresses of respective channels. The addresses to be read out from the memory are thus extracted with ease.

This simple method is realized by the following fact, i.e. when a segment is formed, the blocks' addresses in the memory to be read out are away from each other on the screen, but have the same offset values in horizontal and vertical directions regardless of channels. Thus respective channels differ only in starting addresses in the memory.

A segment is formed by a plurality of blocks read out following the predetermined addresses.

The addresses of blocks, rearrangement, segments and channels are arbitrarily determined.

Exemplary Embodiment 2

Figure 3:
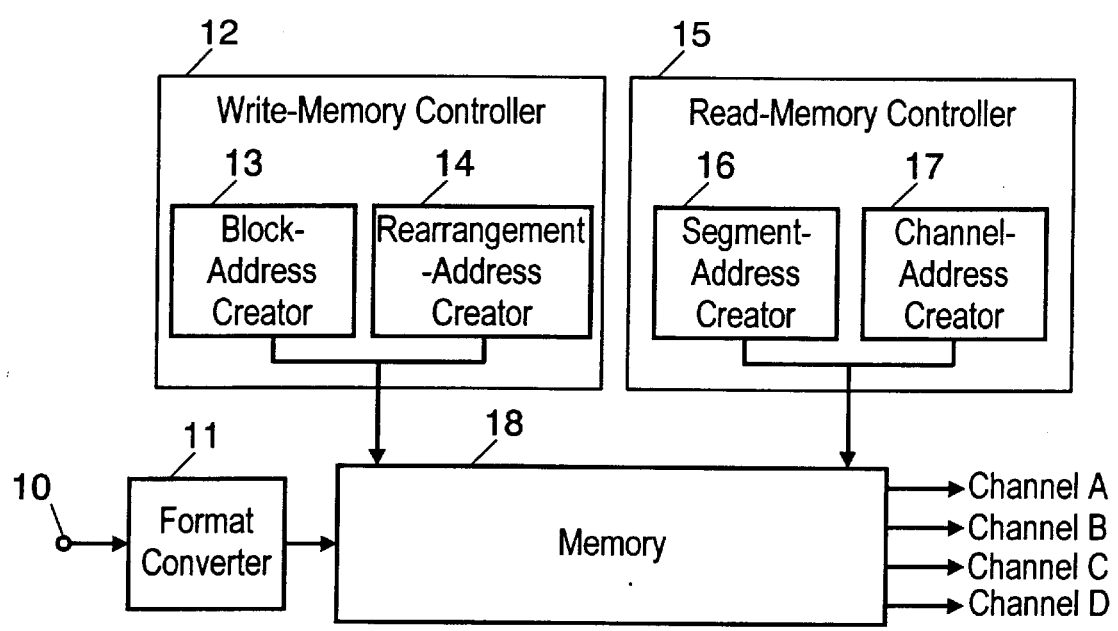
FIG. 3 is a block diagram of a video signal shuffling device in accordance with a second exemplary embodiment of the present invention.

FIG. 3 is a block diagram of a video signal shuffling device in accordance with the second exemplary embodiment of the present invention.

In FIG. 3, a video signal received at input terminal 10 is fed into format converter 11.

Format converter 11 limits the bandwidth and converts a number of pixels of the input signal.

Assume that the input signal is formed of Mp (the number of H pixels) and Np (the number of V lines). Mp and Np have the following relations with an input signal of Xp (H) and Yp (V): Mp>=Xp, Np>=Yp.

Format converter 11 then reduces a number of pixels to convert the input signal into a form of Xp (H)×Yp (V) before supplying the signal to memory 18.

The video-signal-shuffling device discussed above in accordance with the second embodiment can be formed by (a) adding the format converter to the device used in the first embodiment and (b) forming the input signal into a format agreeing with a shuffling pattern. As a result, this shuffling device can deal with signals of various standards.

The format conversion may be applied to either horizontal direction or vertical direction, and the number of pixels can be reduced without limiting a bandwidth. In other words, a number of pixels of input signal should agree with the number of pixels to be shuffled before the conversion.

Exemplary Embodiment 3

Figure 4:
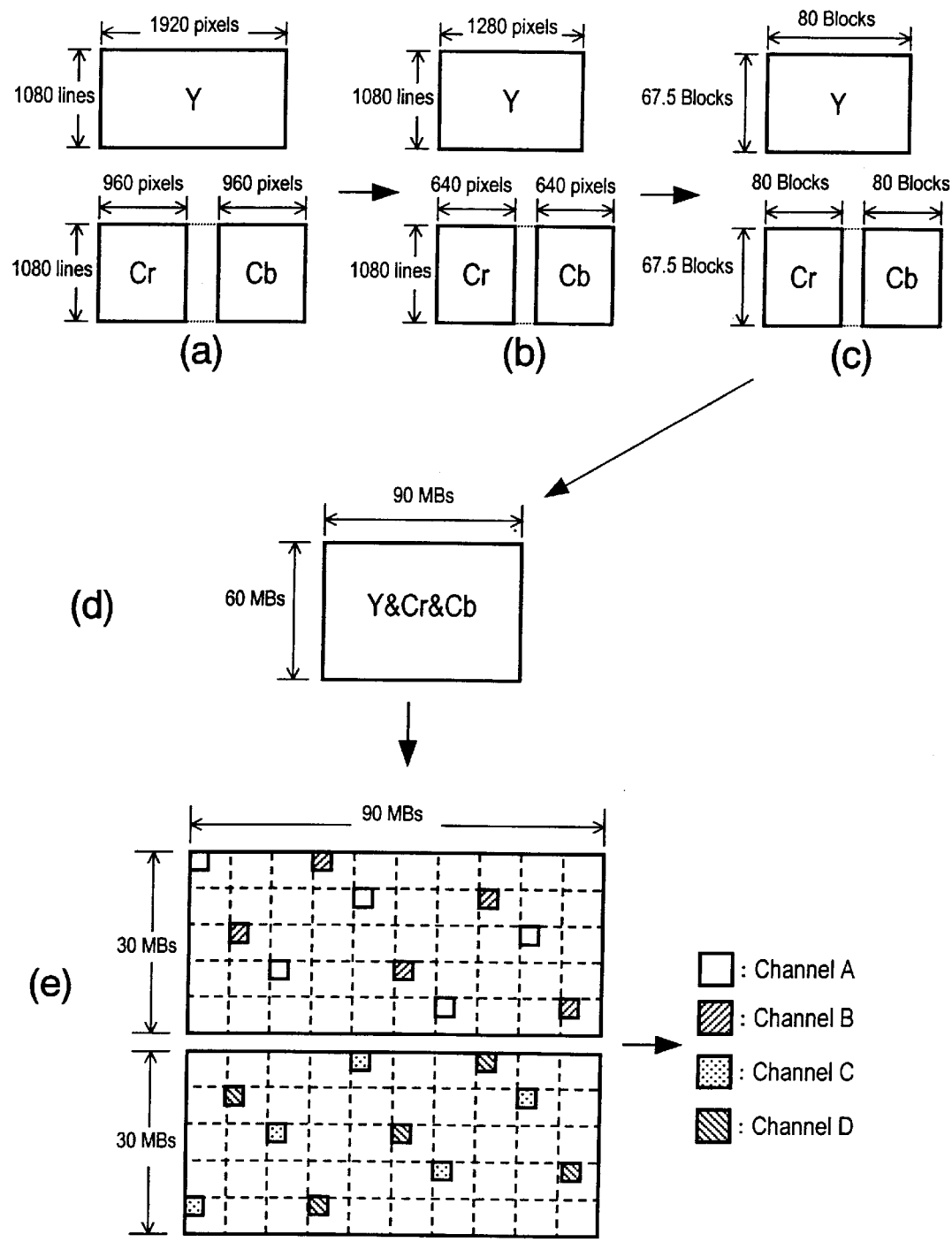
FIGS. 4(a)–4(k) illustrates the shuffling in accordance with a third exemplary embodiment of the present invention.

FIG. 4 illustrates the shuffling in accordance with the third exemplary embodiment of the present invention.

The structure of the shuffling device used in this embodiment is the same as shown in FIG. 3. An operation of this shuffling device is demonstrated with reference to FIGS. 3 and 4.

A video signal of the following characteristics (refer to FIG. 4(a)) is fed into terminal 10.

a number of effective lines: 1080;

a number of effective pixels in horizontal direction of a luminance signal (signal Y): 1920/line; and numbers of effective pixels in horizontal direction of two color-differential signals (signal Cr and signal Cb): 960 each Format converter 11 limits the bandwidth of input signal and converts the input signal into the following format (refer to FIG. 4(b)):

a number of pixels in horizontal direction of signal Y: 1280; and numbers of pixels in horizontal direction of signals Cr and Cb: 640 each.

Regarding region 1 occupying 1072 lines out of 1080 effective lines, block-address creator 13 creates respective addresses for the signal Y formed of 16 pixels (H)×16 lines (V) and for the signals Cr, Cb formed of 8 pixels (H)×16 lines (V).

Regarding region 2 formed of residual 8 lines, creator 13 creates respective addresses for the signal Y formed of 32 pixels (H)×8 lines (V) and for the signals Cr, Cb formed of 16 pixels (H)×8 lines (V).

For an easy understanding purpose, FIG. 4(c) shows a block size in region 2 as same as that in region 1.

A block of signal Y and respective blocks of signal Cr and signal Cb—all of them are at the same spot on the screen—is referred to as a macro block (MB), and the MBs are rearranged to one lump-sum macro-block (LMB) formed of 90 MB (H)×60 MB (V) as shown in FIG. 4(d).

Figure 5:
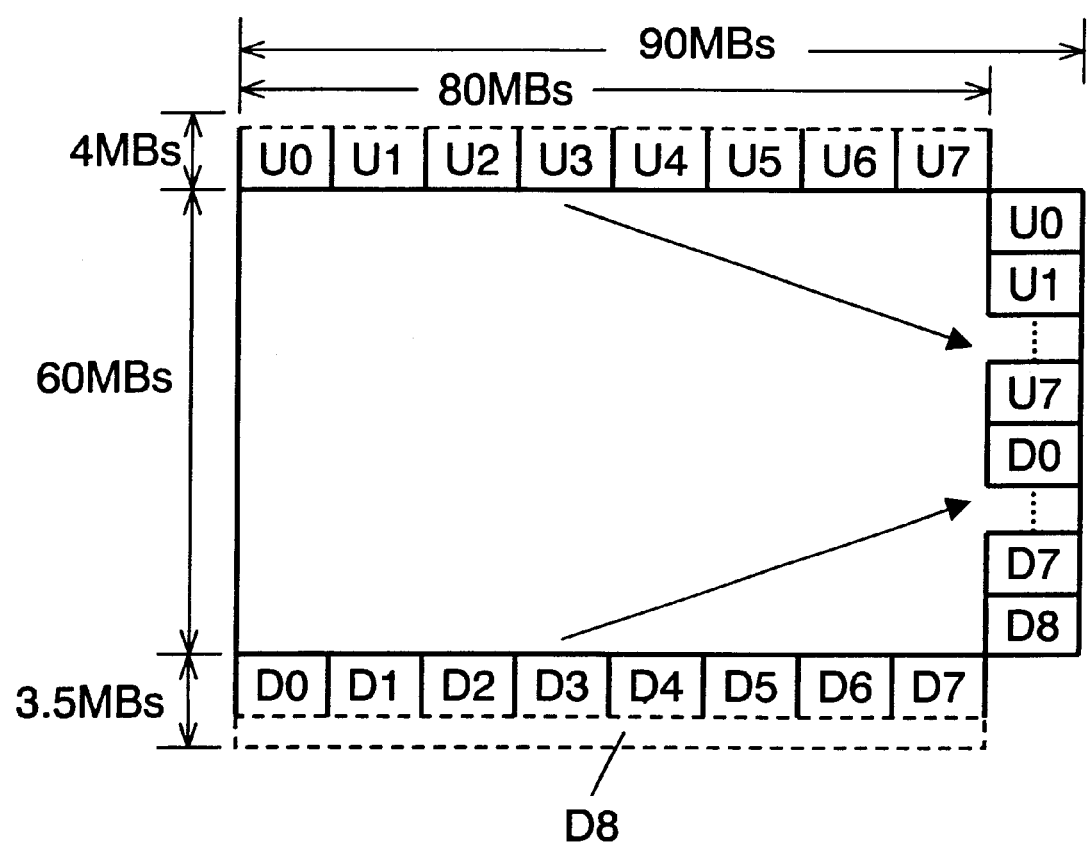
FIG. 5 illustrates rearrangements of blocks in accordance with the third embodiment.

FIG. 5 illustrates rearrangements of blocks in accordance with the third embodiment. As shown in FIG. 5, only the upper and lower ends are rearranged to the right end, and remained 60 MB in the middle are not rearranged.

The upper end, i.e. a region formed of 80 MB (H)×4 MB (V), is divided into 8 sections from U0 to U7 where one unit is 10 MB (H).

The rearrangement is carried out by only moving the row of sections. As a result, a region made by rearrangement is formed of 10 MB (H)×32 MB (V).

Regarding the region of lower end formed of 80 MB (H)×3 MB (V), sections D0–D7 are moved as same as the upper end, as indicated by an arrow mark, so that a region of 10 MB (H)×24 MB (V) is formed.

Residual section D8 formed of 40 MB (H)×1 MB (V) is divided into 4 sub-sections of 10 MB (H), and moved to form a section of 10 MB (H)×4 MB (V).

The rearrangement discussed above forms a lump-sum macro-block of 90 MB (H)×60 MB (V) as shown in FIG. 4(d). This lump-sum MB (LMB) is divided into two regions, each region formed of 90 MB (H)×30 MB (V), where the first region is made of even numbered rows of the LMB, and the second region is made of odd numbered rows of the LMB. These two regions are further divided in H and V directions, i.e. 90 MBs (H) are equally divided into 2Lh pieces (in this embodiment Lh=5, i.e. 90 MBs are divided into 10 sub LMBs). Also, 30 MBs (V) are equally divided into Lv pieces (in this embodiment Lv=5, i.e. 30 MBs are divided into 5 sub-LMBs) as shown in FIG. 4(e). As a result, each of two regions forms 10 sub-LMBs (H)×5 sub-LMBs (V). One sub-LMB (SLMB) is formed of 9 MBs (H)×6 MBs (V).

Each of these two regions is further divided into two groups formed by even numbered columns and odd numbered columns of 10 SLMBs×5 SLMBs. As a result, the two regions are divided into four sub-regions. One sub-regions is formed of 45 MBs (H)×30 MBs (V), i.e. Ms=45, Ns=30 where Ms presents a number of MBs in H direction, and Ns presents a number of MBs in V direction.

In this embodiment, one sub-region is formed of 5 sub-lump-sum MB (H)×5 sub-lump-sum MB (H) as shown with broken lines in FIG. 4(e).

These four sub-regions correspond to output channels A, B, C and D. Small squares in each sub-LMB shown in FIG. 4(e) indicate starting blocks for reading respective channels.

In each sub-region, respective segments are formed of five MBs-each having given offset values identical in horizontal and vertical directions. Each MB is headed by a different starting address.

The forming of this segment is repeated by shifting MBs in vertical and horizontal directions to form the segments corresponding to one frame.

Among the five MBs forming a segment, the offset value of one MB with respect to a location of another MB is defined with the following two equations:

$$Hoff = MOD(k \times Ms/Lh, Ms) \quad (1)$$

$$Voff = MOD(p \times k \times Ns/Lv, Ns) \quad (2)$$

where $MOD(p, Lv) \neq 0$, and $MOD(Lv, p) \neq 0$, and $$k = 1, 2, \ldots, Lh-1,$$

$$MOD(a, b) = -b \times INT(a/b)$$

"a", "b" are integers, and INT (a/b) is a function where decimals are omitted from a result of dividing "a" by "b".

In this third embodiment, p=3 is introduced and offset values of (9, 18), (18, 6), (27, 24), (36, 12) are practically used. The "n" th segment is headed by a block of which position is defined with Hn, Vn, where "n" is a positive integer and Hn, Vn are determined by the following equations (3) and (4).

$$Hn = MOD[H1 + INT\{(n-1)/Lv\}, Ms/Lh] \quad (3)$$

$$Vn = MOD[V1 + Ns/Ls \times MOD(n-1, Lv) + INT\{(n-1)/Lv/(Ms/Lh)\}, N\{4\}]$$

where H1, V1 represent a position of a MB when n=1.

In this third embodiment, one sub-region is formed by 270 (=Ms/Lh×Ns) segments. To be more specific in FIG. 4(e), in one straight column formed by 9 MB (H)×30 MB (V), i.e. one square (H)×five squares (V), the following process is carried out.

Step 1. Scan every 6 MBs in vertical direction.

Step 2. Shift in horizontal direction by one MB at every 5 vertical scans, and do step 1.

Step 3. Shift in vertical direction by one MB at every 45 scans.

Repeat Steps 1, 2, 3 to form 270 segments.

Figure 4F:
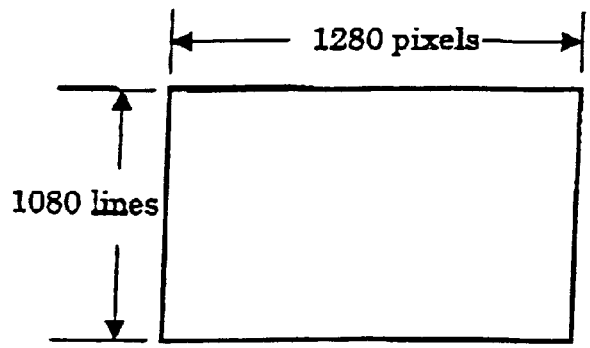
Figure 4G:
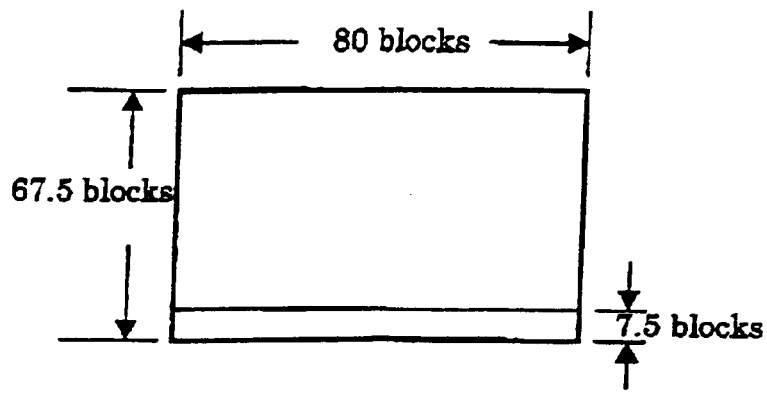
Figure 4H:
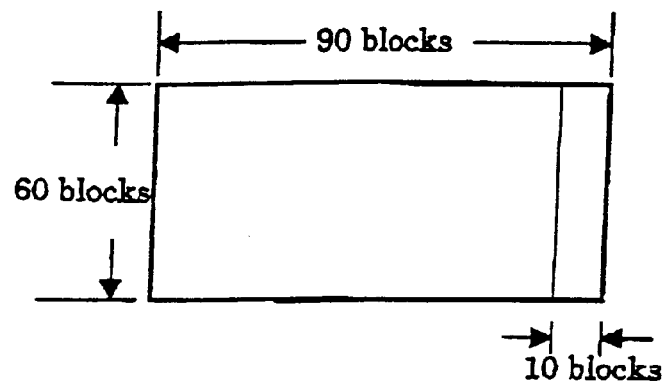
Figure 4I:
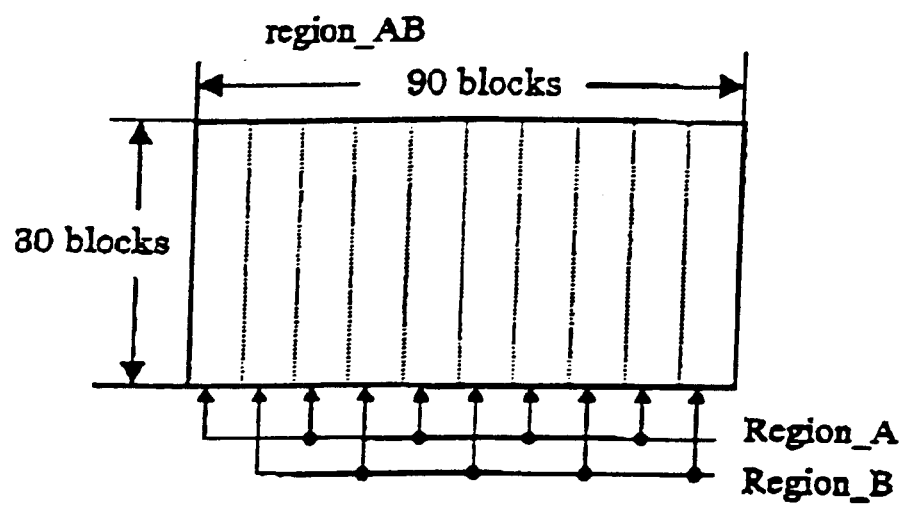
Figure 4J:
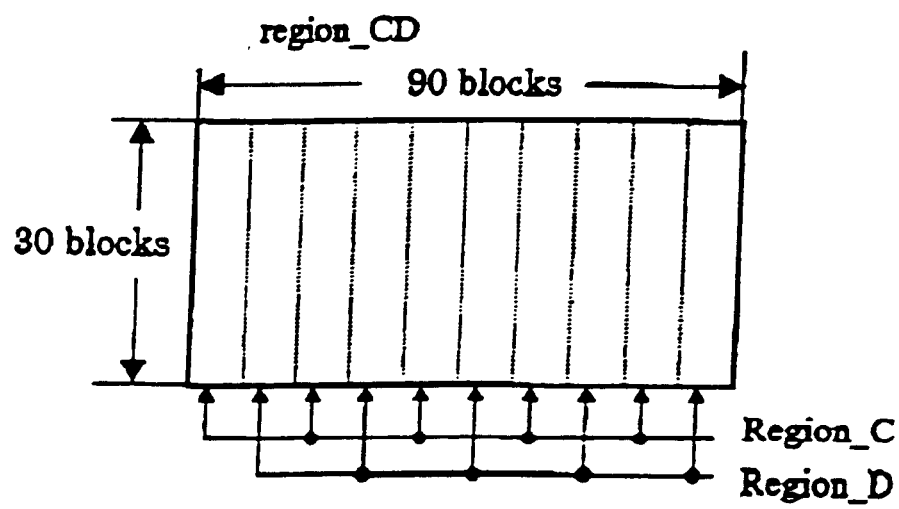
Figure 4K:
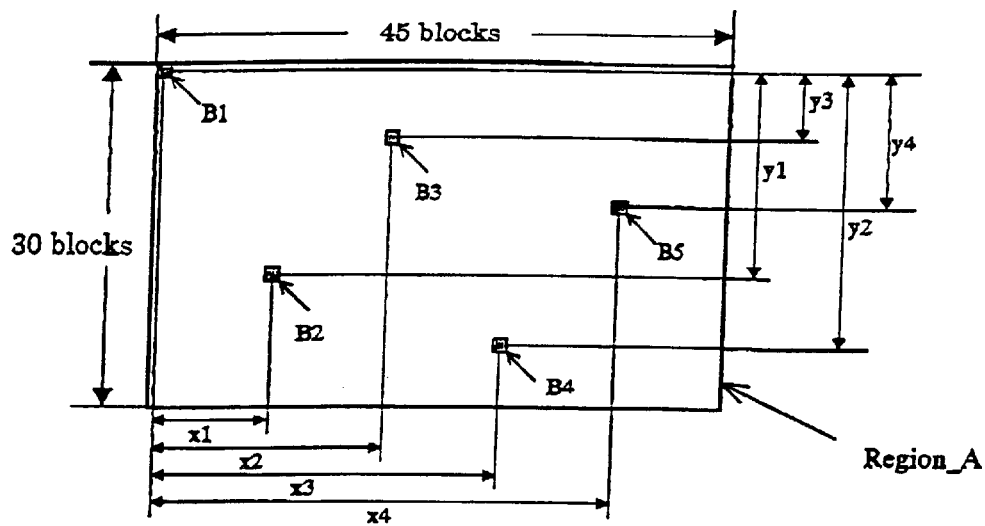

Operation of an exemplary embodiment of the present invention is further illustrated with respect to FIGS. 4(f)–4(k). As shown in FIG. 4(f), a frame of an input video signal includes a number of effective lines equal to 1,080 and a number of effective pixels per line equal to 1,280. The divider divides the frame into blocks. In this case, the block size is equal to 16 pixels×16 lines. The blocks (80×67.5) are shown, for example, in FIG. 4(g). The rearrangement device rearranges the blocks (80×67.5) to blocks (90×60) shown in FIG. 4(h). In this case, the lower side blocks (80×7.5) shown in FIG. 4(g) are rearranged blocks (10×60) at the right side as shown in FIG. 4(h). The segment creator divides the blocks shown in FIG. 4(h) into regions. In this example, the blocks are divided into four regions. This is shown in FIG. 4(i) and FIG. 4(j). Region AB is formed of even numbered rows of 90 columns by 60 rows shown in FIG. 4(h). Then, the 90 blocks of region 4(i) are divided into 10. Region AB is divided into Region A and Region B as shown in FIG. 4(i). Region CD are formed of odd numbered rows of 90 columns by 60 rows shown in FIG. 4(h). Then, the 90 blocks of region CD are divided into 10. Region CD is divided into Region C and Region D as shown in FIG. 4(j). The segment creator then forms a segment. An exemplary segment is shown in FIG. 4(k). In this example, a segment is formed of five blocks. In FIG. 4(k), B1, B2, B3, B4 and B5 are blocks forming a first segment. (x1, y1), (x2, y2), (x3, y3), (x4, y4) are offset values from B1. Offset values of other segments are the same as that of the first segment.

Exemplary Embodiment 4

Figure 6:
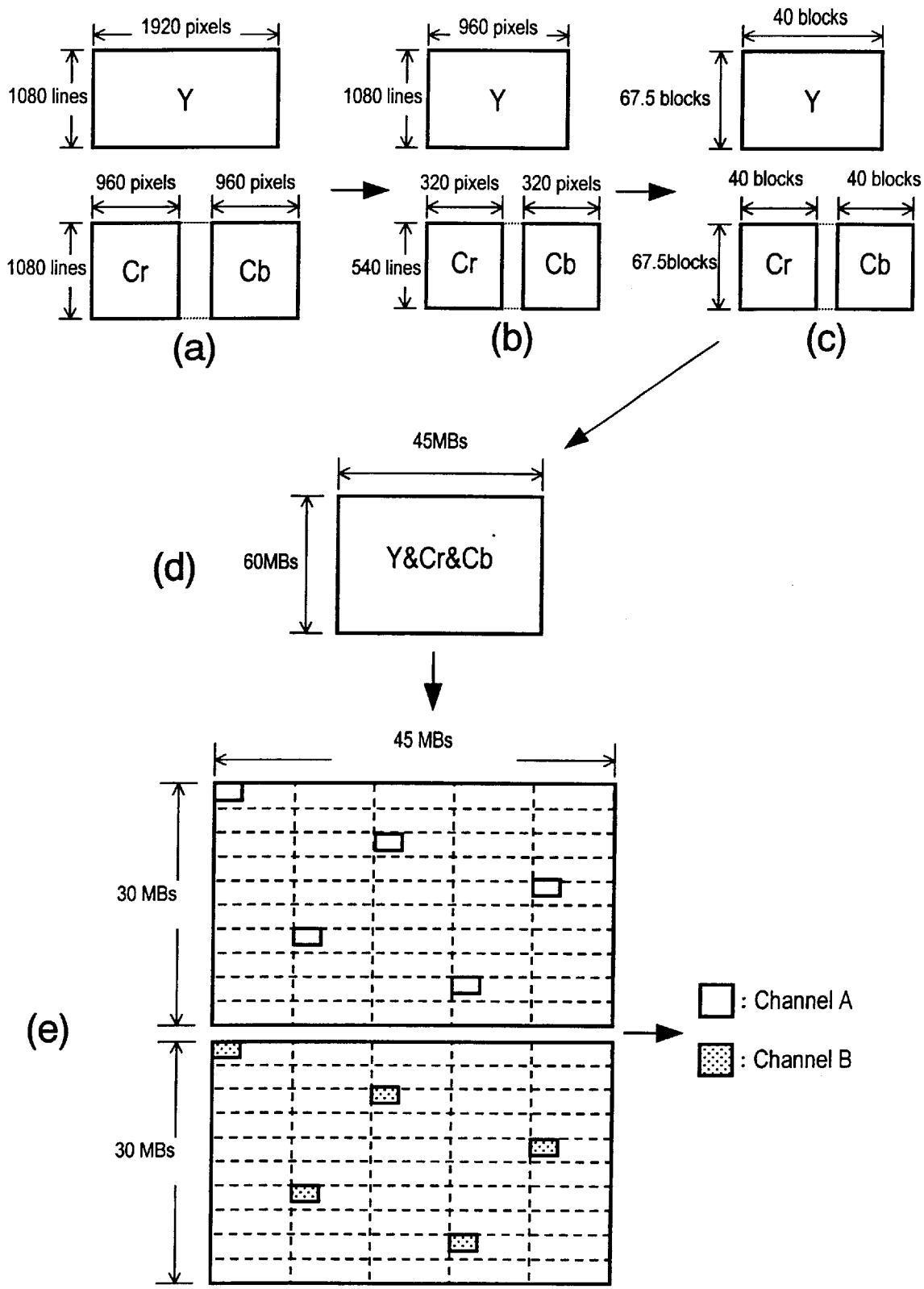
FIG. 6 illustrates the shuffling in accordance with a fourth exemplary embodiment of the present invention.

FIG. 6 illustrates the fourth embodiment. The block diagram of the shuffling device used in this fourth embodiment is the same as shown in FIG. 3. An operation of the shuffling device in accordance with the fourth embodiment is demonstrated with reference to FIG. 3 and FIG. 6.

An input video signal as same as used in the third embodiment is received at terminal 10.

Format converter 11 limits the bandwidth of input signal and converts the input signal into the following format (refer to FIG. 6(b)):

a number of pixels in horizontal direction of signal Y: 960; and numbers of pixels in horizontal direction of signals Cr and Cb: 320 each.

Then the lines of signals Cr and Cb are converted to 540 lines each.

Regarding region 1 occupying 1072 lines out of 1080 effective lines, block-address creator 13 creates respective addresses for the signal Y formed of 24 pixels (H)×16 lines (V) and for the signals Cr, Cb formed of 8 pixels (H)×8 lines (V).

Regarding region 2 formed of residual 8 lines, creator 13 creates respective addresses for the signal Y formed of 48 pixels (H)×8 lines (V) and for the signals Cr, Cb formed of 16 pixels (H)×4 lines (V).

For an easy understanding purpose, FIG. 6(c) shows a block size in region 2 as same as that in region 1.

A block of signal Y and respective blocks of signal Cr and signal Cb□all of them are at the same spot on the screen—is referred to as a macro block (MB), and the MBs are rearranged to one lump-sum macro-block (LMB) formed of 45 MB (H)×60 MB (V) as shown in FIG. 6(d).

Figure 7:
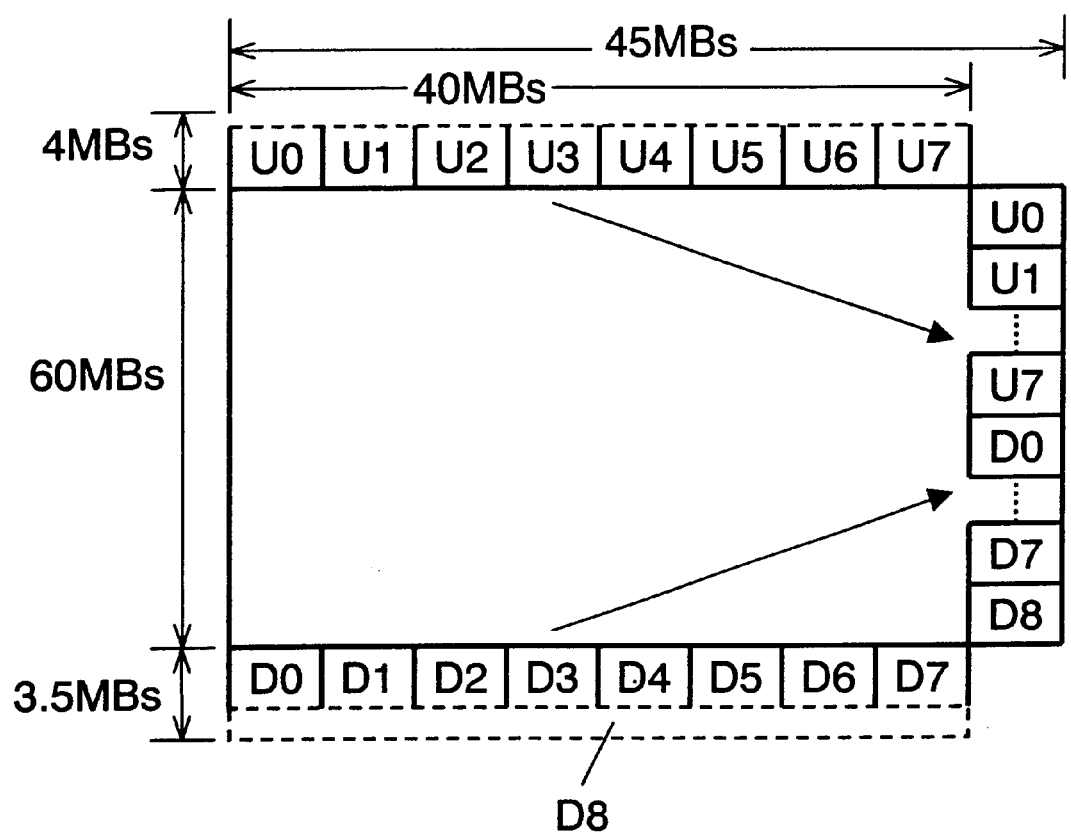
FIG. 7 illustrates rearrangements of blocks in accordance with the fourth embodiment.

FIG. 7 illustrates the rearrangement in accordance with this fourth embodiment; however, the number of horizontal MBs is reduced to a half of what is discussed in the third embodiment. Thus detailed description is omitted here.

One LMB is divided in this way: 45 MBs (H) is equally divided into Lh pieces (Lh=5), and 30 MBs (V) is equally divided into 2 Lv pieces (Lv=10).

As a result, the LMB forms 5 sub-LMBs (H)×20 sub-LMBs (V). One sub-LMB (SLMB) is formed of 9 MBs (H)×3 MBs (V). One LMB is divided into two regions as shown in FIG. 6(e).

Each region is formed of 45 MBs (H)×30 MBs (V) i.e. Ms=45 and Ns=30 in this embodiment.

The first region is formed of even number columns, i.e. 5 SLMBs (H)×20 SLMBs (V), and the second region is formed of odd numbered columns.

The segments formed in these two regions are output to channel A and channel B respectively.

In this embodiment, each small box drawn with dotted lines in FIG. 6(e) is formed of 9 MBs×3 MBs (V).

The smaller boxes drawn with solid lines in some dotted boxes in FIG. 6(e) indicate the starting blocks for reading respective channels.

In this embodiment, both channels form respectively a segment made of 5 MBs, each MB having the predetermined offset values from the identical starting position in horizontal and vertical directions.

The offset values of 5 MBs forming a segment in a region is defined by the equations (1) and (2) in the third embodiment.

In this fourth embodiment, p=6 is introduced and offset values of (9, 18), (18, 6), (27, 24), (36, 12) are practically used.

The "n" th segment is headed by a block of which position is defined with Hn, Vn, where "n" is a positive integer and Hn, Vn are determined by the following equations (5) and (6).

$$Hn = \text{MOD}[H1 + \text{INT}\{(n-1)/(Ns/Lv)\}, Ms/Lh] \quad (5)$$

$$Vn = (Ns/Lv) \times \text{MOD}[\text{INT}\{V1/(Ns/Lv)\} + \text{INT}\{(n-1)/(Ms/Lh)/(Ns/Lv)\}, Lv]+$$

$$\text{MOD}(Hn+1, 2) \times \text{MOD}\{V1+(n-1), (Ns/Lv)\}+$$

$$\text{MOD}(Hn, 2) \times \text{MOD}[(Ms/Lh) \times (Ns/Lv) - \text{MOD}\{Ci+n,$$

$$(Ms/Lh) \times (Ns/Lv)\}, (Ns/Lv)] \quad (6)$$

where $Ci = (Ns/Lv) - \text{MOD}\{V1, (Ns/Lv)\}$. H1 and V1 represent a position of a MB when n=1.

To be more specific, firstly scan the MBs within the dotted box, and when the vertical scanning is completed, shift horizontally by 1 MB before repeating the vertical scanning. The direction of the vertical scanning is reversed at each horizontal shift.

When all the MBs in a dotted box are completely scanned, another dotted box beneath the scanned box is scanned, and this process is repeated, thereby finally forming 270 segments in each region.

Exemplary Embodiment 5

Figure 8:
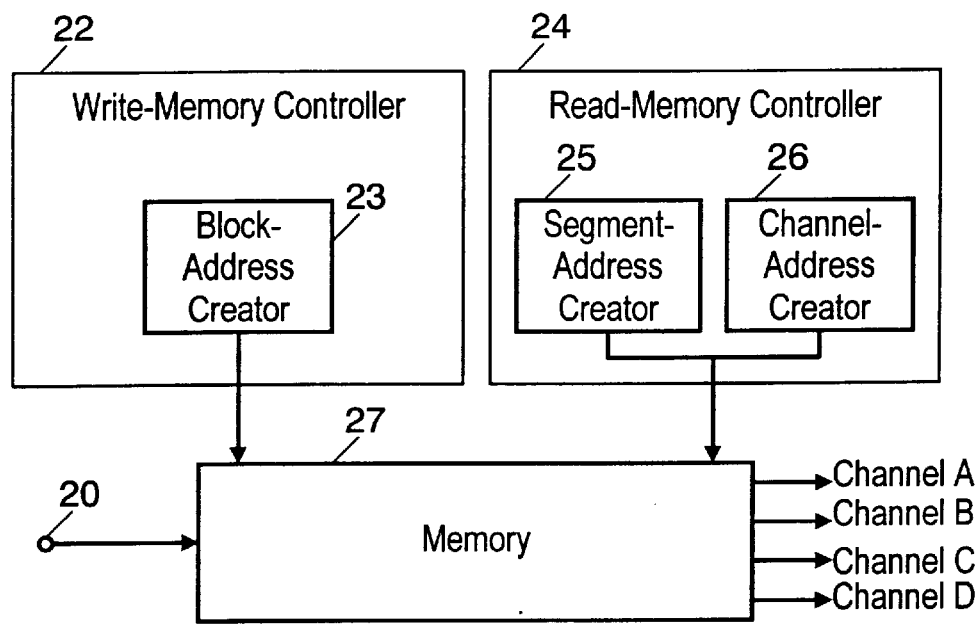
FIG. 8 is a block diagram of a video signal shuffling device in accordance with a fifth exemplary embodiment of the present invention.

FIG. 8 is a block diagram if a shuffling device in accordance with the fifth embodiment. In FIG. 8, block-address creator 23 in write-memory controller 22 operates similarly to creator 13 in the first embodiment, thus the description thereof is omitted here.

Read-memory controller 24 reads out data from a memory using segment-address creator 25 and channel-address creator 26.

The middle part on the screen is processed in the same way as the first embodiment. Regarding other parts on the screen, the data is supplied to a specific channel, e.g. channel A.

The address to be read out from the memory on the middle part of the screen is created as follows: First, segment-address creator 25 creates the addresses based on segments to be output to respective channels A, B, C and D. Channel-address creator 26 creates offset values for respective channels both in horizontal and vertical directions. The offset values are added to the addresses of respective channels. The addresses to be read out from the memory are thus extracted with ease.

The shuffling device in accordance with the fifth embodiment allows the signals of HDTV to be shuffled free from the rearrangement carried out in the first embodiment, and to be supplied to a plurality of channels. Further, all the parts except the middle part on the screen do not use every channel, and thus non-active channels can be used with other data.

The addresses of blocks, rearrangement, segments and channels are arbitrarily determined.

Exemplary Embodiment 6

Figure 9:
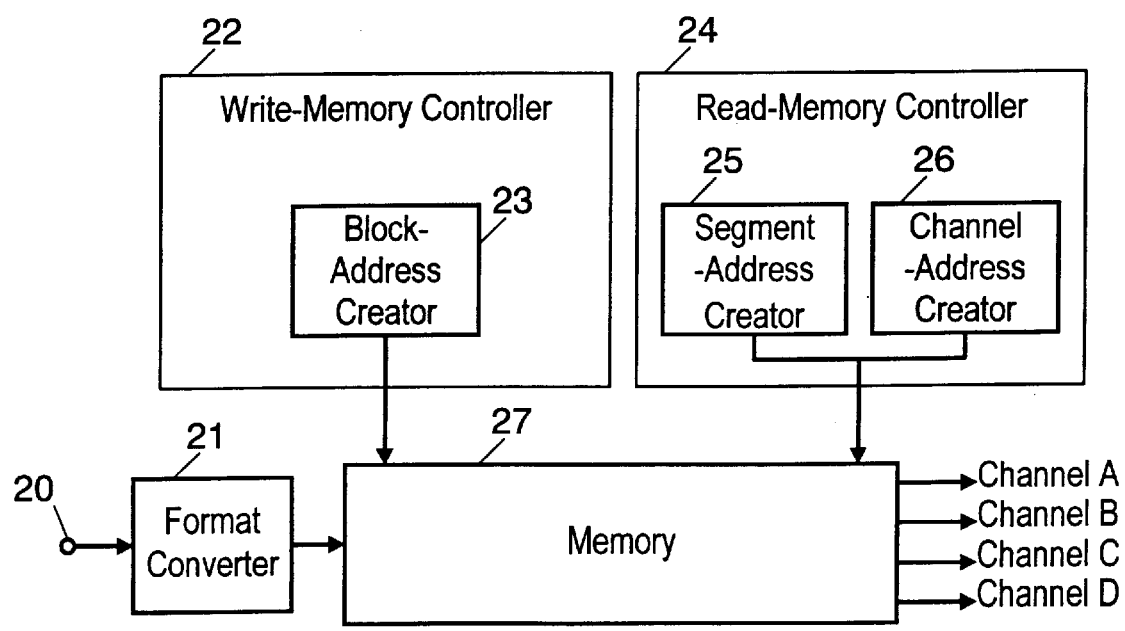
FIG. 9 is a block diagram of a video signal shuffling device in accordance with a sixth exemplary embodiment of the present invention.

FIG. 9 is a block diagram of a shuffling device in accordance with the sixth exemplary embodiment of the present invention. In FIG. 9, the blocks operating in the same way as those used in FIG. 8 bear the same reference numbers.

In FIG. 9, a video signal received at input terminal 20 is fed into format converter 21, where the video signal is converted its resolution. Then the signal is supplied to memory 27.

The operations of write-memory controller 22, block-address creator 23, read-memory controller 24, segment-address creator 25 and channel-address creator 26 are the same as those in the fifth embodiment.

The shuffling device of the sixth embodiment is formed by adding format-converter 21 to the device used in the fifth embodiment, thereby allowing an input signal to be converted in a format according to a shuffling pattern. As a result, the shuffling device can deal with more standards of video signals. The format conversion may be applied to either horizontal direction or vertical direction, and the number of pixels can be reduced without limiting a bandwidth. In other words, a number of pixels of input signal should agree with the number of pixels to be shuffled.

Exemplary Embodiment 7

Figure 10:
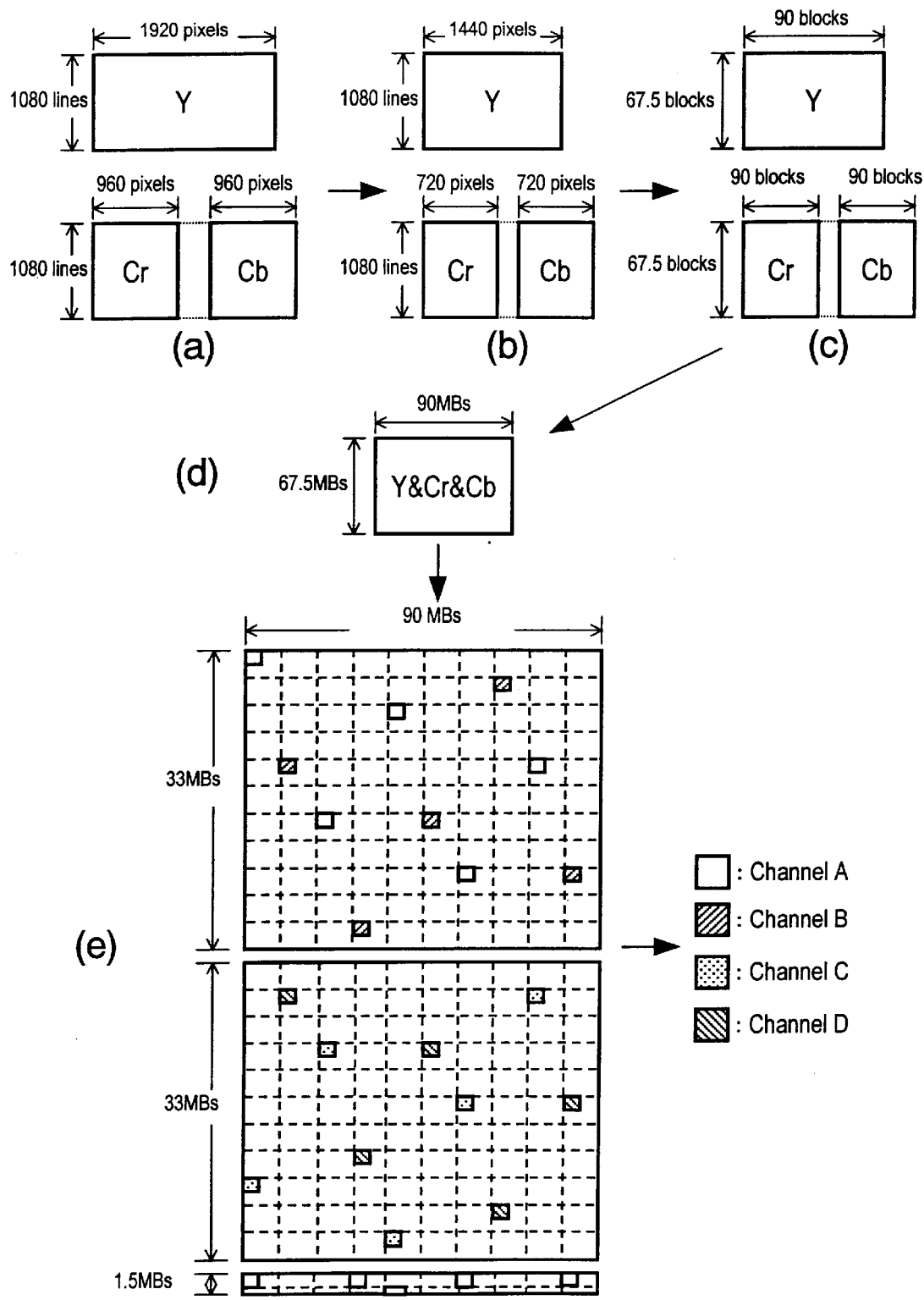
FIG. 10 is a block diagram of a video signal shuffling device in accordance with a seventh exemplary embodiment of the present invention.

FIG. 10 illustrates the seventh exemplary embodiment of the present invention. The block diagram of the shuffling device used in this seventh embodiment is the same as shown in FIG. 9.

A video signal of the following characteristics (refer to FIG. 10(*a*)) is fed into terminal 20.

a number of effective lines: 1080;

a number of effective pixels in horizontal direction of a luminance signal (signal Y): 1920/line; and numbers of effective pixels in horizontal direction of two color-differential signals (signal Cr and signal Cb): 960 each Format converter 21 limits the bandwidth of input signal and converts the input signal into the following format (refer to FIG. 10(*b*)):

a number of pixels in horizontal direction of signal Y: 1440; and numbers of pixels in horizontal direction of signals Cr and Cb: 720 each.

Regarding region 1 occupying 1056 lines out of 1080 effective lines, block-address creator 23 creates respective addresses for the signal Y formed of 16 pixels (H)×16 lines (V) and for the signals Cr, Cb formed of 8 pixels (H)×16 lines (V). As a result, 90 MBs (H)×66 MBs (V) is formed.

Residual region 2 formed of residual 24 lines is divided into sub-region 2*a* formed of 16 lines and sub-region 2*b* formed of 8 lines. Block-address creator 23 creates respective addresses for these two sub-regions, i.e. (1) the signal Y of sub-region 2*a* is formed of 16 pixels (H)×16 lines (V) and the signals Cr, Cb are respectively formed of 16 pixels (H)×8 lines (V). As a result, 90 blocks (H)×1 block (V) is formed. (2) the signal Y of sub-region 2*b* is formed of 32 pixels (H)×8 lines (V) and the signals Cr, Cb are respectively formed of 16 pixels (H)×8 lines (V). As a result, 45 blocks (H)×1 block (V) is formed.

For an easy understanding purpose, FIG. 10(*c*), (*d*), (*e*) show the same pixel-arrangement of a block in sub-region 2*b* as that in region 1.

Those blocks thus formed form one macro block (MB) by gathering the blocks of signals Y, Cr and Cb at the same position on the screen, and thereby forming a lump-sum MB formed of 90 MBs (H)×67.5 MBs (V) as shown in FIG. 10(*d*).

Region 1 formed of 90 MBs (H)×66 MB (V) is divided into two sub-regions. The first sub-region is formed of even numbered rows of region 1, and the second sub-regions is formed of odd numbered rows of region 1. As a result, each one of these two sub-regions is formed of 90 MBs (H)×33 MBs (V) as shown in FIG. 10(*e*).

The two sub-regions of region 1 is divided in this way: 90 MBs (H) are equally divided into 2 Lh (in this embodiment, Lh=5) pieces, and 33 MBs (V) are equally divided into Lv (in this embodiment, Lv=11) pieces. Each of the sub-regions forms 10 SLMBs (H)×11 SLMBs (V), where one SLMB is formed of 9 MBs (H)×3 MBs (V). Each of the sub-region is further divided into two regions, i.e. two sub-regions is divided into region A, B, C and D. To be more specific, region A is formed of even numbered columns of one sub-region forming 10 SMBs (H)×11 SLMBs (V), and region B is formed of odd numbered columns. Regions C, D are formed in the same manner. As a result, region 1 is divided into four regions, i.e. regions A, B, C and D, each formed of 45 MBs (H)×33 MBs (V).

The four regions of region 1 correspond to output channels A, B, C and D. The small boxes drawn with solid lines in FIG. 10(*e*) indicate starting blocks for reading respective channels.

In each sub-region, respective segments are formed of five MBs-each having given offset values identical in horizontal and vertical directions. Each MB is headed by a different starting address.

In this seventh embodiment, offset values of five MBs forming a segment in a region are specified (9, 18), (18, 6), (27, 24), (36, 12). The "n" th segment is headed by a block of which position is defined with Hn, Vn, where "n" is a positive integer and Hn, Vn are determined by the equations (3) and (4) as they were done in the third embodiment. In the case of the seventh embodiment, Ms=45, Ns=33, Lh=5, and Lv=11 are used, where Ms represents a number of MBs in H direction, and Ns does a number of MBs in V direction.

As a result, 297 segments are formed per one region, and the four regions corresponds to one frame.

Region 2 is formed of 135 MBs in total. In this embodiment, each MB is numbered from the upper row to lower row and from the left-end column to the right. One segment is formed by 5 MBs, thus new segment is produced every 27 MBs, i.e. a first segment headed by MB 0 includes MB 27, MB 54, MB 81 and MB 108, and a second segment headed by MB 1 includes MB 28, MB 55, MB 82 and MB 109. Twenty-seven segments thus produced are output to channel A as shown in FIG. 10(*e*).

The embodiments 1–7 discussed above prove that the shuffling devices of the present invention allow the signals of HDTV to be shuffled and supplied to plurality of channels by the following steps. (1) Dividing an input video signal into blocks with block-addresses in writing into a memory, (2) creating rearrangement addresses when necessary and rearranging the blocks, and (3) creating addresses using segment-addresses and channel-addresses.

Exemplary Embodiment 8

Figure 11:
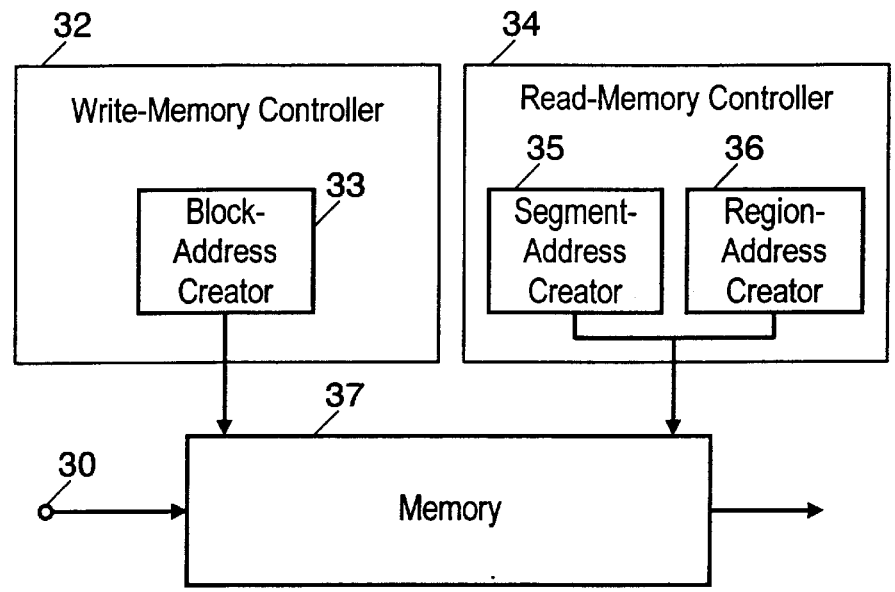
FIG. 11 is a block diagram of a video signal shuffling device in accordance with an eighth exemplary embodiment of the present invention.

FIG. 11 is a block diagram of a video-signal-shuffling device. In FIG. 11, a progressive video signal received at input terminal 30 is fed into memory 37.

Write-memory controller 32, functioning as a divider, writes the input-data from a screen location to the memory address calculated by block-address creator 33.

Read-memory controller 34, functioning as a segment-generator, creates a read-out address using segment-address creator 35 and region-address creator 36, then reads the data out of memory 37.

A small region formed of a plurality of blocks in the memory is handled as one unit, and region-address creator 36 divides the one frame video signal stored in the memory into 2×Lh (Lh=, 2, 3, . . . ) pieces in horizontal direction. The even-numbered pieces out of the 2×Lh pieces in horizontal direction are collected to form a first region, and odd-numbered pieces are collected to fore a second region. Further, in consecutive two frames of input progressive signals, sections corresponding to the first frame are named region A and a region B. Similarly, sections corresponding to the second frame are named region C and region D. Region-address creator 36 determines which sections the data to be read belongs to, and outputs the address.

The read-out address from memory 37 is created in the following manner:

First, addresses based on segments Nos. output from each region are created in segment-address creator 35. Then the offset values of each region both in horizontal and vertical directions are added to the addresses. The offset values have been created by region-address creator 36.

This simple method is realized by the following fact, i.e. when a segment is formed, the blocks' addresses in the memory to be read out are away from each other on the screen, but have the same offset values in horizontal and vertical directions regardless of regions. Thus respective regions differ only in starting addresses in the memory.

The shuffling device in accordance with the eighth embodiment discussed above thus allows an input progressive signal to be divided into plurality of sections, and then shuffled.

Exemplary Embodiment 9

Figure 12:
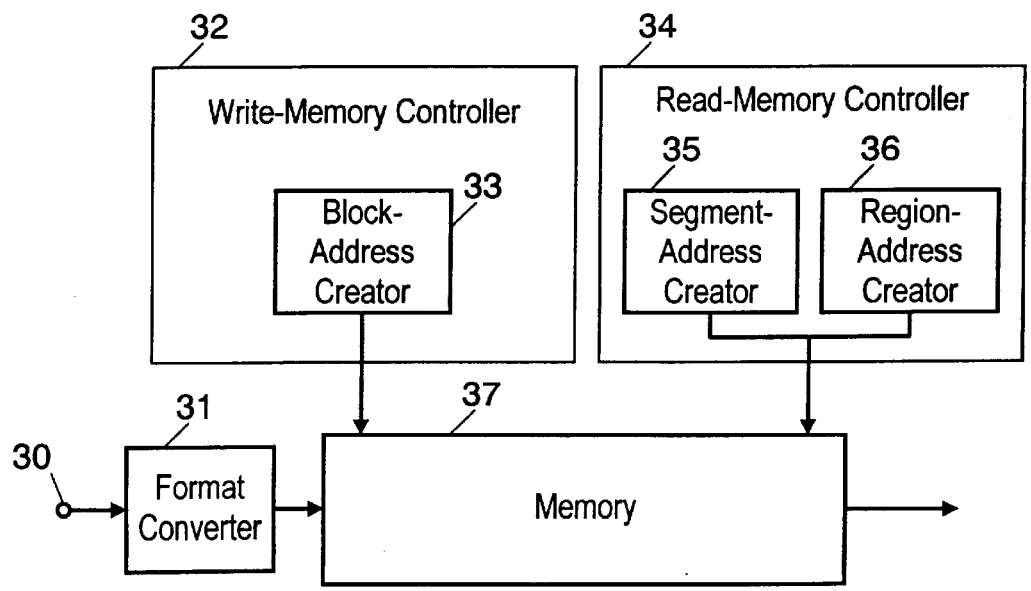
FIG. 12 is a block diagram of a video signal shuffling device in accordance with a ninth exemplary embodiment of the present invention.

FIG. 12 is a block diagram of a video-signal-shuffling device in accordance with the ninth embodiment. In FIG. 12, the blocks operating in the same way as discussed in the eighth embodiment bear the same reference numbers, thus the descriptions thereof are omitted here.

A progressive video signal received at input terminal 30 is fed into format converter 31. Format converter 31 limits the bandwidth and converts a number of pixels of the input signal before storing the signal into memory 37.

When the input signal has a higher resolution than that of in the eighth embodiment, format converter 31 limits the bandwidth and reduces a number of pixels to convert the input signal into the same pixel size before outputting the signal.

Thus the shuffling device in accordance with this ninth embodiment can be supplemented with format converter 31 in addition to the structure of the eighth embodiment so that the shuffling device can handle much more types of progressive signals than what was demonstrated in the eighth embodiment.

The format converter used in the ninth embodiment can not only reduce a number of pixels but also increase the number of pixels by adding or interpolating dummy data. The bandwidth limitation is not always needed. In other words, a number of input pixels may be agreed with a number of pixels to be shuffled.

Exemplary Embodiment 10

Figure 13:
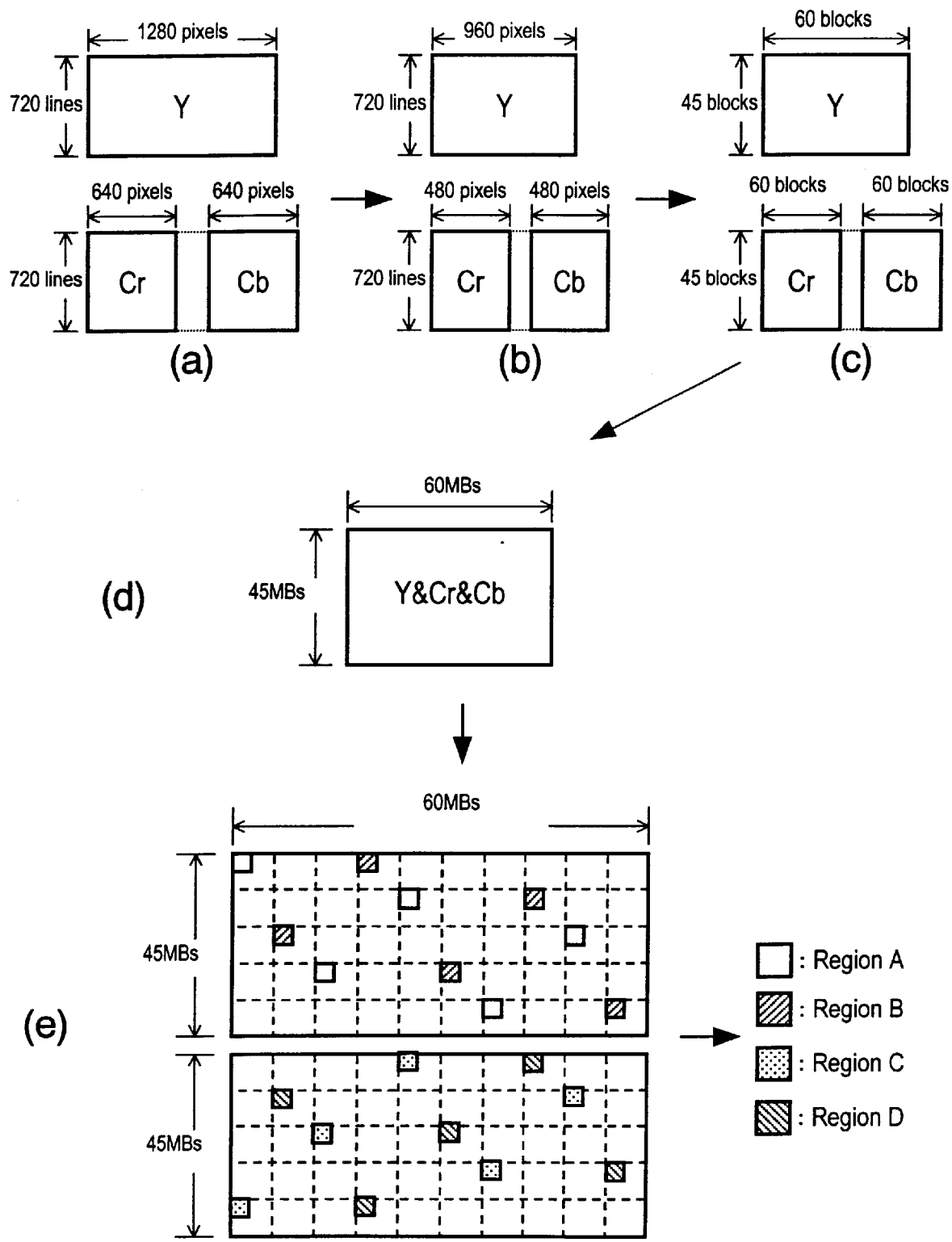
FIG. 13 illustrates the shuffling in accordance with a tenth exemplary embodiment of the present invention.

FIG. 13 illustrates the tenth embodiment of the present invention. The shuffling device used in the tenth embodiment has the same block diagram as that shown in FIG. 12.

In FIG. 12 and FIG. 13, a progressive video signal of the following characteristics (refer to FIG. 13(*a*)) is fed into terminal 30.

a number of effective lines: 720;

a number of effective pixels in horizontal direction of a luminance signal (signal Y): 1280/line; and numbers of effective pixels in horizontal direction of two color-differential signals (signal Cr and signal Cb): 640 each Format converter 31 limits the bandwidth of input signal and converts the input signal into the following format (refer to FIG. 13(b)):

a number of pixels in horizontal direction of signal Y: 960; and numbers of pixels in horizontal direction of signals Cr and Cb: 480 each.

Block-address creator 34 creates respective block-addresses for the signal Y divided into blocks, each block formed of 16 pixels (H)×16 lines (V) and for the signals Cr, Cb divided into blocks, each block formed of 8 pixels (H)×16 lines (V). As a result, as shown in FIG. 13(c), signal Y comprises 60×45 blocks, and signals Cr, Cb comprise 60×45 blocks.

Blocks of signals Y, Cr, Cb located at the same screen position form a macro block (MB), so that a lump-sum macro block (LMB) comprising 60 MBs (H)×45 MBs (V) is formed as shown in FIG. 13(d).

Two consecutive frames form one unit for the onward processes.

Each frame is divided in the following way: 60 MBs (H) are equally divided into 2 Lh (Lh=5) pieces, and 45 MBs (V) are equally divided into Lv (Lv=5) pieces. As a result, each frame forms 10 SLMB (H)×5 SLMBs (V) as shown in FIG. 13(e). One sub-LMB (SLMB) is formed of 6 MBs (H)×9 MBs (V).

A first frame is further divided into region A and region B. Region A is formed of even numbered columns out of 10 SLMB (H)×5 SLMBs (V) forming the first frame, and region B is formed of odd numbered columns thereof. A second frame is divided into region C and region D. Region C is formed of even numbered column out of 10 SLMB (H)×5 SLMBs (V) forming the second frame, and region D is formed of odd numbered columns thereof As described above, two consecutive frames form four regions, each region being formed of 30 MBs (H)×45 MBs (V).

The small boxes drawn with dotted lines in FIG. 13(e) indicate the equally divided LMBs. Each small dotted box comprises 6 MBs (H)×9 MBs (V).

The smaller boxes drawn with solid lines in some dotted boxes in FIG. 13(e) indicate the starting MBs for reading respective regions. As shown in FIG. 13(e), a segment made of 5 MBs is formed, each MB having the predetermined offset values in horizontal and vertical directions from the addresses of different starting positions in each regions.

The offset values in H and V directions of 5 MBs forming a segment in a region is defined by the equations (1) and (2) of the third embodiment.

In this embodiment, k=1, 2, 3 and 4, Ms=30, Ns=45, p=3, Lv=5, Lh=5, and offset values are (6, 27), (12, 9), (18, 36), and (24, 18) are practically used.

The segments are formed by repeating the shift of MBs in H and V directions, so that the segments corresponding to two frames are completed.

The "n" th segment is headed by a block of which position is defined with Hn, Vn, where "n" is a positive integer and Hn, Vn are determined by the equations (3) and (4) as they were done in the third embodiment.

In this tenth embodiment, Ms=30, Ns=45, Lh=5 and Lv=5 are used in equations (3) and (4). As a result, 270 segments in total are formed in each region.

Exemplary Embodiment 11

Figure 14:
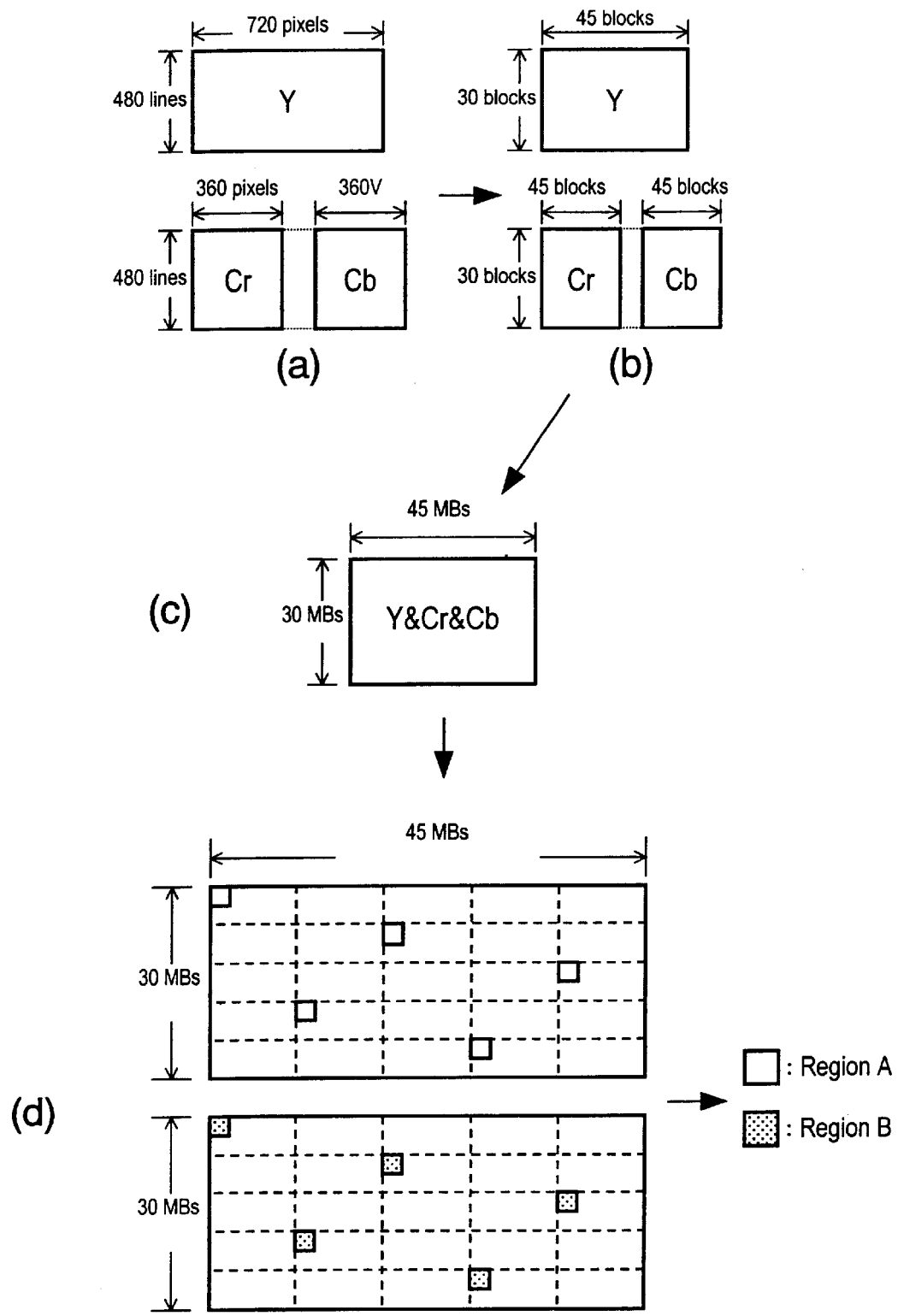
FIG. 14 illustrates the shuffling in accordance with an 11th exemplary embodiment of the present invention.

FIG. 14 illustrates 11th exemplary embodiment of, the present invention. A video-signal-shuffling device used in this 11th embodiment has the block diagram same as that described in FIG. 11. The shuffling device in accordance with 11th embodiment is demonstrated with reference to FIG. 11 and FIG. 14.

A progressive video signal of the following characteristics (refer to FIG. 14(a)) is fed into terminal 30.

a number of effective lines: 480;

a number of effective pixels in horizontal direction of a luminance signal (signal Y): 720; and numbers of effective pixels in horizontal direction of two color-differential signals (signal Cr and signal Cb): 360 each Block-address creator 32 creates respective block-addresses for the signal Y divided into blocks, each block formed of 16 pixels (H)×16 lines (V) and for the signals Cr, Cb divided into blocks, each block formed of 8 pixels (H)×16 lines (V). As a result, as shown in FIG. 14(b), respective signals Y, Cr, and Cb comprise 45×30 blocks.

Blocks of signals Y, Cr, Cb located at the same screen position form a macro block (MB), so that a lump-sum macro block (LMB) comprising 45 MBs (H)×30 MBs (V) is formed as shown in FIG. 14(c).

Two consecutive frames form one unit for the onward processes.

The macro blocks in each frame are equally divided into 5 (H) and 5 (V). The first frame is a first region, and the second frame is a second region.

The small boxes drawn with dotted lines in FIG. 14(d) indicate the equally divided LMBs. Each small dotted box comprises 9 MBs (H)×6 MBs (V).

The smaller boxes drawn with solid lines in some dotted boxes in FIG. 14(d) indicate the starting MBs for reading respective regions. As shown in FIG. 14(d), a segment made of 5 MBs is formed, each MB having the predetermined offset values in horizontal and vertical directions from the addresses of identical starting positions in each regions.

The offset values in H and V directions of 5 MBs forming a segment in a region is defined by the equations (1) and (2) of the third embodiment.

In this embodiment, k=1, 2, 3 and 4, Ms=45, Ns=30, p=3, Lv=5, Lh=5, and offset values are (9, 18), (18, 6), (27, 24), and (36, 12) are practically used.

The "n" th segment is headed by a block of which position is defined with Hn, Vn, where "n" is a positive integer and Hn, Vn are determined by the equations (3) and (4) as they were done in the third embodiment.

In this tenth embodiment, Ms=45, Ns=30, Lh=5 and Lv=5 are used in equations (3) and (4). The segments are formed by repeating the shift of MBs in H and V directions, so that the segments corresponding to two frames are completed. As a result, 270 segments in total are formed for two frames.

The video-signal-shuffling device in accordance with the 11th exemplary embodiment thus allows a progressive signal having 480 effective lines to be regionally divided and shuffled.

Exemplary Embodiment 12

Figure 15:
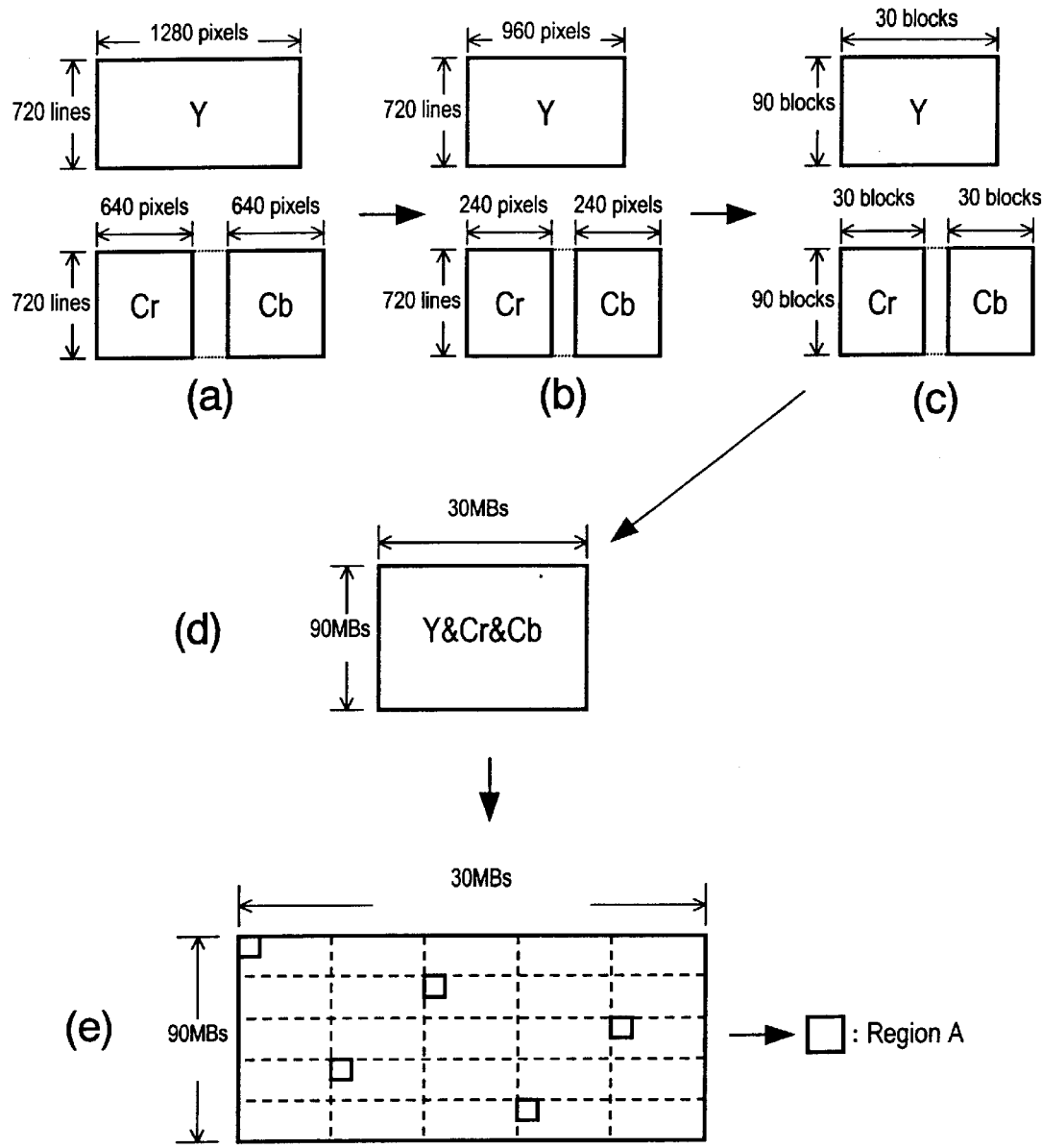
FIG. 15 illustrates the shuffling in accordance with a 12th exemplary embodiment of the present invention.

FIG. 15 illustrates the 12h exemplary embodiment of the present invention. A video-signal-shuffling device used in this 12th embodiment has the block diagram same as that described in FIG. 12. The shuffling device in accordance with 12th embodiment is demonstrated with reference to FIG. 12 and FIG. 15.

A progressive video signal of the following characteristics (refer to FIG. 15(a)) is fed into terminal 30.

a number of effective lines: 720;

a number of effective pixels in horizontal direction of a luminance signal (signal Y): 1280; and numbers of effective pixels in horizontal direction of two color-differential signals (signal Cr and signal Cb): 640 each Format converter 31 converts the input signal into the following format (refer to FIG. 15(*b*)):
- a number of pixels in horizontal direction of signal Y: 960, and
- numbers of pixels in horizontal direction of signals Cr and Cb: 240 each.

Block-address creator 34 creates respective block-addresses for the signal Y divided into blocks, each block formed of 32 pixels (H)×8 lines (V) and for the signals Cr, Cb divided into blocks, each block formed of 8 pixels (H)×16 lines (V). As a result, as shown in FIG. 15(*c*), respective signals Y, Cr, and Cb comprise 30×9 blocks.

Blocks of signals Y, Cr. Cb located at the same screen position form a macro block (MB), so that a lump-sum macro block (LMB) comprising 30 MBs (H)×90 MBs (V) is formed as shown in FIG. 15(*d*).

The LMB shown in FIG. 15(*d*) is divided equally into 5 pieces in H and V directions as shown in FIG. 15(*e*). Data are sequentially read out from the starting block of each region thereby forming 540 segments.

The shuffling device used in the 12th embodiment converts a format in a different way from that in 10th embodiment, and allows a progressive signal having 720 effective lines to be shuffled.

Parts of this embodiment can be modified as follows without changing the advantages. The formats of signals Cr, Cb are converted into 480 effective pixels (H) and 360 effective lines (V). Then the signals are divided by a block of 16 pixels (H)×16 lines (V), so that a lump-sum macroblock (LMB) formed of 60 MBs (H)×45 MBs (V). The LMB is divided equally into 5 pieces in H and V directions. As a result, 540 segments are formed by altering the process carried out in 12th embodiment.

Embodiments 8 through 11 discussed previously prove that the video-signal-shuffling devices of the present invention comprises:
- a write-memory controller having a block-address creator; and
- a read-memory controller having a segment-address creator and a region-address creator.

This structure divides a frame of an input progressive-video-signal into at least one region, so that the region can be divided into the same number of segments as that of a SDTV signal. In this case, one frame or consecutive two frames are handled as one unit to be processed. As a result, an input progressive signal can be shuffled.

Although this was not described in the previous embodiments, a segment can be supplied with ease to an output channel corresponding to a region created by the region-address creator, and thus the present invention includes this idea.

A program recording medium including programs and data concerning all the functions or parts of all the functions of the video-signal-shuffling devices discussed in embodiments 1 through 12 is also within the scope of the present invention. This medium is loaded into a computer, then the computer operates the functions of the programs.

Control of coding-quantity of the present invention is demonstrated hereinafter. First, a quantizer and a priority used in the following exemplary embodiments are described.

Quantizing numbers, which specifies the steps of quantization, are assigned to respective quantizer. Hereinafter, quantizers are expressed with the respective numbers, such as quantizer 0, quantizer 1, quantizer 2, and so on. The greater number needs the smaller step size. In other words, the smaller step size produces the greater coding-quantity.

Regarding the priority, priority numbers are assigned such as priority 0, priority 1, priority 2, and so on. An offset value corresponding the priority number is set.

When receiving an offset value, a quantizer starts quantizing with the new quantizing number including its proper number plus the offset value.

The new quantizing number sometimes falls outside the range of quantizing numbers prepared by the apparatus. In such a case, when the new number exceeds the maximum number prepared by the apparatus, this maximum quantizing number is used. When an offset value is a negative one, and a new quantization number is thus less than a minimum quantizing number prepared by the apparatus, this minimum quantizing number is used.

Exemplary Embodiment 13

Figure 16:
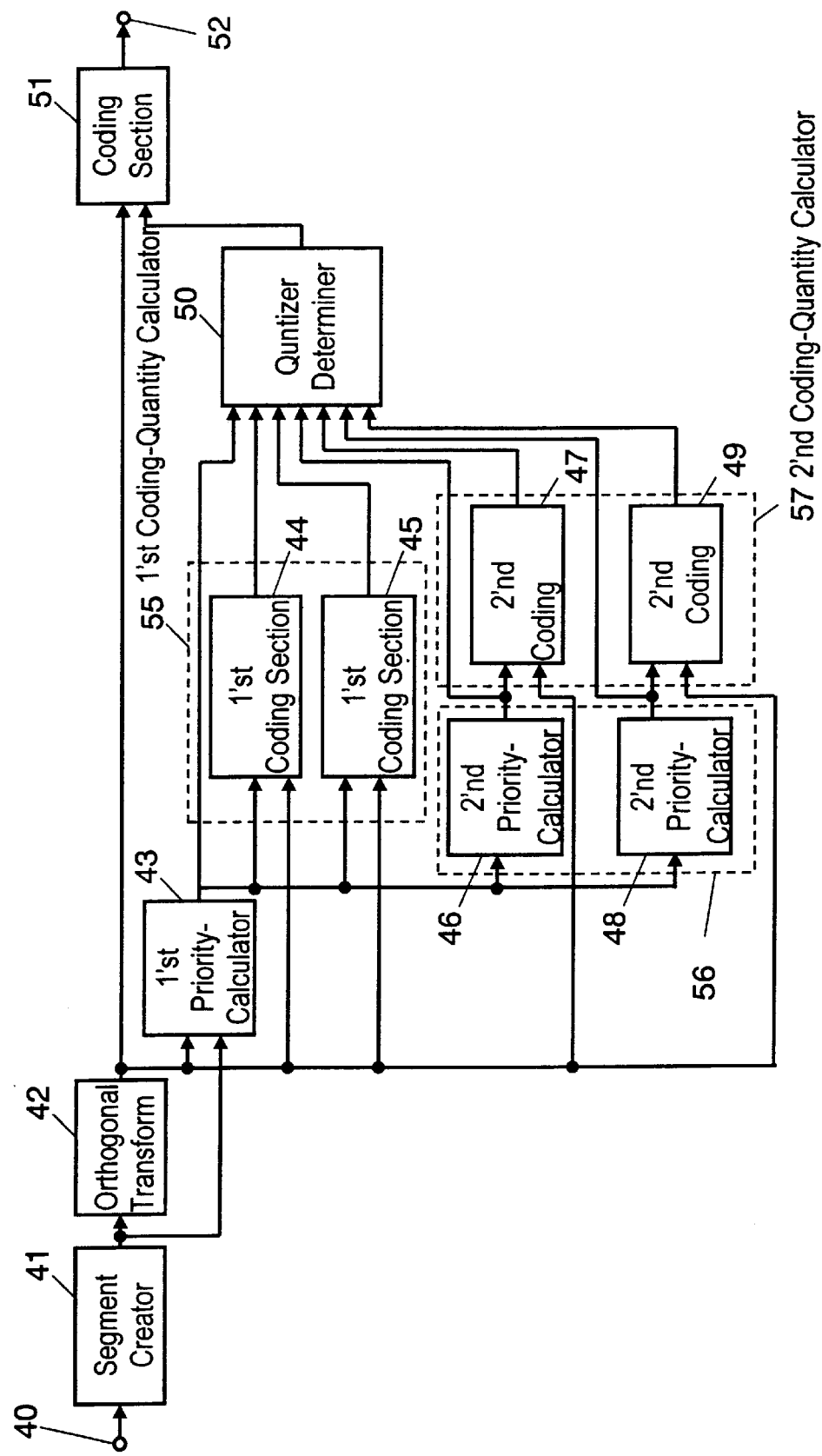
FIG. 16 is a block diagram of a coding device in accordance with a 13th exemplary embodiment.

FIG. 16 is a block diagram of a coding device in accordance with the 13th exemplary embodiment of the present invention.

In FIG. 16, a video signal received at input terminal 40 is fed into segment creator 41, where the video signal is divided into blocks-each block being formed by 8×8 pixels. Twenty segments form one segment, and this one segment is a unit for controlling coding-quantity.

Each segment is fed into orthogonal transformer 42 and a first priority-calculator 43. The segment input undergoes orthogonal transform and is supplied as orthogonally transformed data. This data is fed into the first priority-calculator 43, first coding sections 44, 45, second coding sections 47, 49 and coding section 51.

First coding-quantity calculator 55 comprises a first coding sections 44 and 45. Second coding-quantity calculator 49 comprises second coding sections 47 and 49.

First priority-calculator 43 calculates a first priority of each block based on the block data before and after the orthogonal transform. In this embodiment, two priorities are available, i.e. priority 0 and priority 1. The first priority of each block is fed into first coding sections 44, 45, second priority calculators 46, 48 and quantizer-determiner 50.

Second priority-calculator 46 changes specific priorities out of the first priorities supplied, and establishes a second priority. This second priority is fed into second coding section 47 and quantizer determiner 50.

Another second priority-calculator 48 changes specific priorities out of the first priorities supplied, and establishes a second priority. This second priority is fed into second coding section 49 and quantizer determiner 50.

First coding section 44 including quantizer 0 (not shown) and another first coding section 45 including quantizer 1 (not shown) quantize the respective orthogonally transformed data with the new quantizing number including their proper quantizing numbers plus the offset values given by the first priority.

Each priority has its proper offset values, e.g. priority 0 has offset 1, and priority 1 has offset 0 in this embodiment.

For instance, when a block has priority 1, quantizer 0 and quantizer 1 quantize the block with their respective quantizing numbers 1 and 1. (Quantizing number plus offset value is limited by the maximum number of a quantizer.) In the similar manner, when the block has priority 0, quantizer 0 and quantizer 1 quantize the block with their respective quantizing numbers 0 and 1.

Coding sections 44 and 45 further performs a variable-length-coding, thereby calculating coding-quantity. The 20 blocks in one segment undergo the same process discussed above for extracting the coding-quantity of the segment.

The coding-quantity of the segment extracted in first coding sections 44 and 45 is fed into quantizer determiner 50.

Second priority-calculators 46, 48 changes specific priorities out of the first priority supplied, and sets second priorities. These second priorities set by calculator 46, 48 are fed into second coding section 47, 49 respectively and then into quantizer determiner 50.

Second coding section 47 including quantizer 0 (not shown) and another second coding section 49 including quantizer 1 (not shown) quantize the respective orthogonally transformed data with the new quantizing number including their proper quantizing numbers plus the offset values given by the second priority. This is a similar manner as coding sections 44, 45 did.

Each priority has its proper offset values, e.g. priority 0 has offset 1, and priority 1 has offset 0 in this embodiment. Coding sections 47 and 49 further performs a variable-length-coding, thereby calculating coding-quantity.

The 20 blocks in one segment undergo the same process discussed above for extracting the coding-quantity of each segment.

The respective coding-quantities of each segment extracted in second coding sections 47 and 49 are fed into quantizer determiner 50.

Quantizer determiner 50 determines a final coding-quantity based on segments' coding quantities of extracted in first and second coding sections, 44, 45, 47 and 49 as well as target coding-quantity. A quantizer and a priority corresponding to the final coding-quantity are selected as the final quantizer and priority.

For instance, when a coding quantity at first coding section 45 becomes the final coding-quantity, quantizer 1 and the first priority are selected as the final ones. If a total coding-quantity at second coding section 47 becomes the final coding-quantity, quantizer 0 is selected as the final one and the second priority set by the second priority-calculator 46 is selected as the final one.

The final quantizer with its quantizing number and the final priority are fed into coding section 51.

Coding section 51 quantizes the orthogonally transformed data with a new quantizing number including its proper quantizing number plus an offset value given by the final quantizer and priority, then provides the data with a variable-length-coding process, and finally outputs coded-data of the segment from output terminal 52. If this offset value given by the final quantizer and priority exceeds "1" (one), quantizer 1 is selected.

Output terminal 52 supplies the coded-data to recording or transmitting medium.

Figure 17:
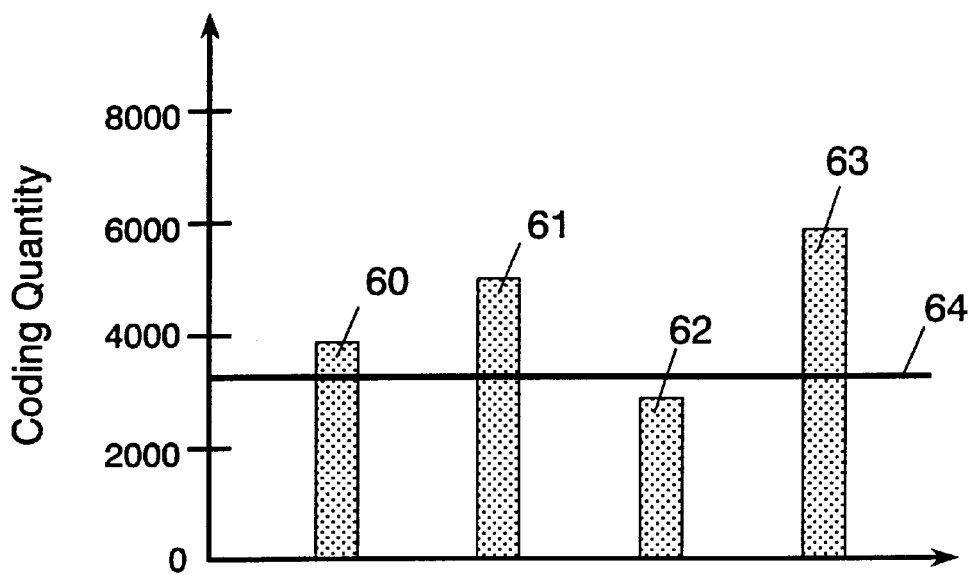
FIG. 17 illustrates a determination of a final quantizer and a final priority in accordance with the 13th exemplary embodiment.

In FIG. 17, coding-quantities 60, 61, 62 and 63 represent respective coding-quantities of coding sections 44, 45, 47 and 49. All the coding-quantities except quantity 62 exceed target coding-quantity 64. In this case, quantizer 0 corresponding to coding section 47 becomes the final quantizer, and the second priority calculated by second priority-calculator 46 becomes the final priority.

Figure 18:
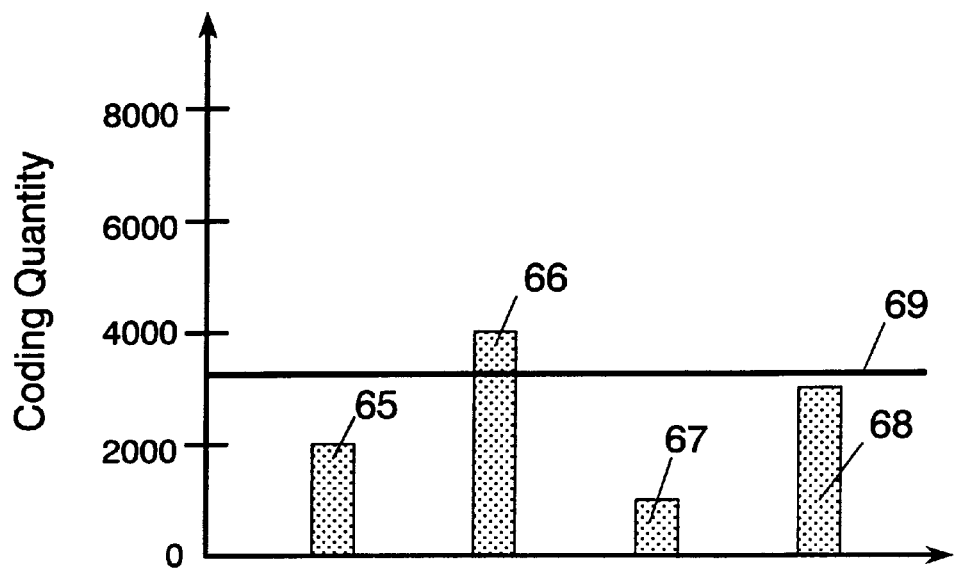
FIG. 18 illustrates a determination of a final quantizer and a final priority in accordance with a 13th exemplary embodiment of the present invention.

FIG. 18 illustrates how to determine the final quantizer and priority with regard to segment S1 in accordance with this embodiment.

In FIG. 18, coding-quantities 65, 66, 67 and 68 represent respective coding-quantities of coding sections 44, 45, 47 and 49. Quantity 66 only exceeds target coding-quantity 69. In this case, quantizer 0 corresponding to coding section 44 becomes the final quantizer, and the first priority becomes the final priority. The coding-quantity in coding section 49 is the maximum coding-quantity not more than the target coding-quantity; however, the coding-quantity in coding section 44 becomes the final coding-quantity because the first coding section is advantageously treated over the second coding section.

Exemplary Embodiment 14

The block diagram of a video-signal-coding device in accordance with the 14th exemplary embodiment is the same as that shown in FIG. 16.

In FIG. 16, basic structure and operation are the same as those described in 13th embodiment.

In this 14th embodiment, second priority-calculator 46 calculates all the priorities as priority 1—the lowest priority, and second coding section 47 encodes the data with quantizer 0 having the largest quantization step. In this case, coding section 47 produces the least coding-quantity.

As such, a priority is set so that second priority-calculator 56 extracts the least coding-quantity, and a quantizer is selected so that second coding-quantity calculator 57 extracts the least coding-quantity. As a result, overflow can be avoided.

Exemplary Embodiment 15

The block diagram of a video-signal-coding device in accordance with the 15th exemplary embodiment is the same as that shown in FIG. 16.

In FIG. 16, basic structure and operation are the same as those described in 13th embodiment.

In this 15th embodiment, when priority 1 is applied, first coding sections 44, 45 respectively adopt the values, i.e. all the AC coefficients are divided by 2, as new orthogonally transformed data instead of the orthogonally transformed data supplied.

Each quantizer uses a new quantizing number including its proper quantizing number plus an offset value given by the first priority for quantization. (When the new quantizing number becomes 2, exceeding the maximum number, quantizing number 1 is employed.)

Coding sections 44, 45 provides variable-length-coding process to the data for calculating the coding-quantity of the block. Twenty blocks in the segment undergo the same process, and the coding-quantity of each segment is calculated.

The coding-quantity calculated by first coding sections 44, 45 are fed into quantizer determiner 50.

When priority 1 is applied, second coding sections 47, 49 respectively adopt the values, i.e. all the AC coefficients are divided by 2, as new orthogonally transformed data instead of the orthogonally transformed data supplied. Each quantizer uses a new quantizing number including its proper quantizing number plus an offset value given by the second priority for quantization. (When the new quantizing number becomes 2, exceeding the maximum number, quantizing number 1 is employed.)

Coding sections 47, 49 provides variable-length-coding process to the data for calculating the coding-quantity of the block. Twenty blocks in the segment undergo the same process, and the coding-quantity of each segment is calculated. The coding-quantity calculated by second coding sections 47, 49 are fed into quantizer determiner 50.

When priority 1 is applied, coding sections 51 adopts the values, i.e. all the AC coefficients are divided by 2, as new orthogonally transformed data instead of the orthogonally transformed data supplied. Coding section 51 uses a new quantizing number including its proper quantizing number plus an offset value given by the first priority for quantization. Coding section 51 further provides variable-length-coding process to the data. Then coding section 51 outputs coded data of the segment from output section 52. In this case, if the offset value given by the final quantizer and priority exceeds "1" (one), quantizer 1 is selected.

Figure 19:
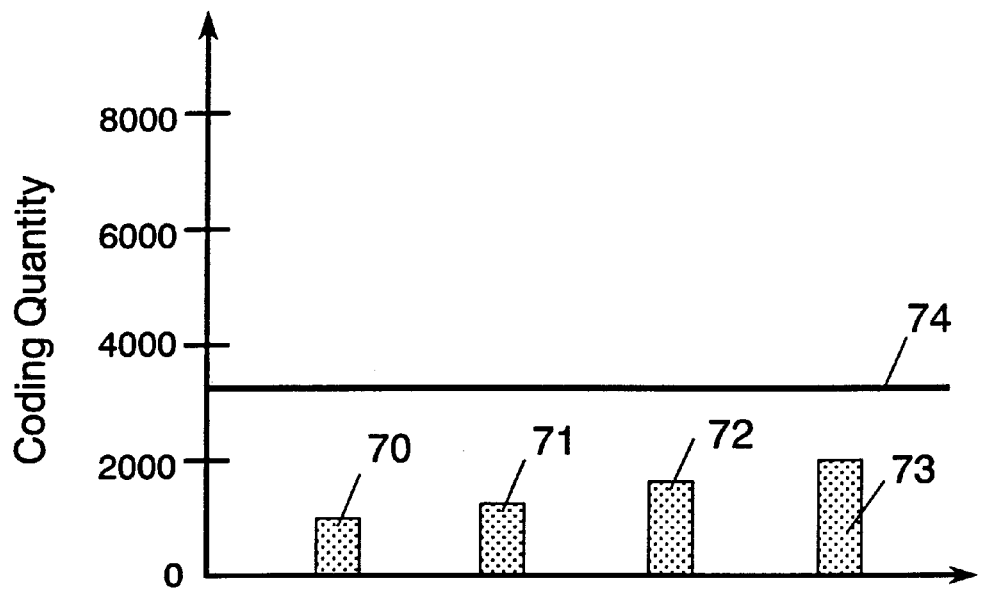
FIG. 19 illustrates a determination of a final quantizer and a final priority in a video signal coding device in accordance with a 15th exemplary embodiment of the present invention.

FIG. 19 illustrates how to determine the final quantizer and priority with regard to segment S0 in accordance with this embodiment.

In FIG. 19, coding-quantities 70, 71, 72 and 73 represent respective coding-quantities of coding sections 44, 45, 47 and 49. Quantity 70, 71, 72 and 73 are not more than target coding-quantity 74. In this case, quantizer 1 corresponding to coding section 49becomes the final quantizer, and the second priority calculated by second priority-calculator 48 becomes the final priority.

Exemplary Embodiment 16

The block diagram of a video-signal-coding device in accordance with the 16th exemplary embodiment is the same as that shown in FIG. 16.

In FIG. 16, basic structure and operation are the same as those described in 13th embodiment.

In this 16th embodiment, second priority-calculator 46 calculates all the priorities as priority 1—the lowest priority, and second coding section 47 encodes the data with quantizer 0 having the largest quantization step.

Second priority-calculator 48 calculates all the priorities as priority 0, the greatest priority, and second coding-section 49 encodes the data with quantizer 1 having the smallest quantization step. Others except these two cases are the same as discussed in the 15th embodiment.

In this case, coding section 47 produces the least coding-quantity, and coding-section 49 produces the greatest coding-quantity.

Figure 20:
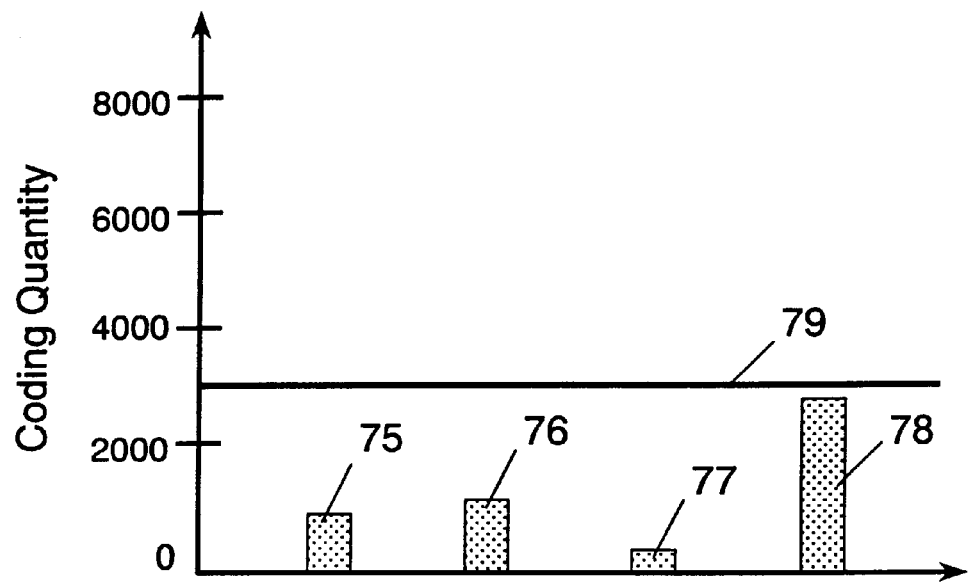
FIG. 20 illustrates a determination of a final quantizer and a final priority in a video signal coding device in accordance with a 16th exemplary embodiment of the present invention.
Figure 21:
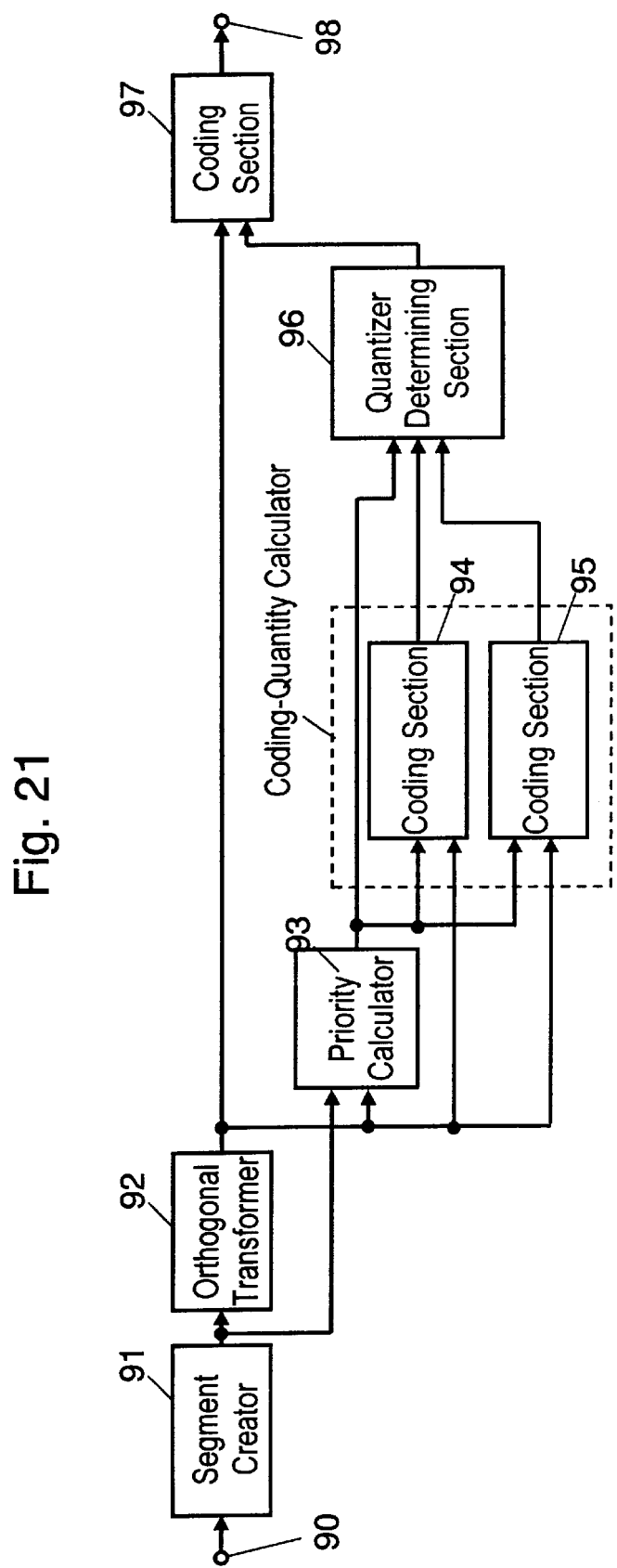
FIG. 21 is a block diagram of a video signal coding device relating to a conventional method of controlling code-quantity.

FIG. 20 illustrates how to determine the final quantizer and priority with regard to segment S0 in accordance with this embodiment.

In FIG. 20, coding-quantities 75, 76, 77 and 78 represent respective coding-quantities of coding sections 44, 45, 47 and 49. Quantity 75, 76, 77 and 78 are not more than target coding-quantity 79. In this case, quantizer 1 corresponding to coding section 49 becomes the final quantizer, and the second priority calculated by second priority-calculator 48becomes the final priority.

Exemplary Embodiment 17

The block diagram of a video-signal-coding device in accordance with the 17h exemplary embodiment is the same as that shown in FIG. 16.

In FIG. 16, basic structure and operation are the same as those described in 13th embodiment.

In this 17th embodiment, quantizer determiner 50 uses the maximum coding-quantity as the final one, the maximum quantity being not more than the target coding-quantity among coding-quantities of coding-sections 44, 45, 47 and 49.

The way of determining the final quantizer and priority of segment S0 is described with reference to FIG. 18.

In this embodiment, coding-quantity 68 is the final coding-quantity, and quantizer 1 corresponding to second coding-section 49 becomes the final quantizer, and second priority-calculator 48 extracts the final priority.

The embodiments 13 through 17 previously discussed prove that the coding device relating to controlling coding-quantity selects L pieces of quantizers out of available quantizers, then quantizes orthogonally transformed data of each block with a first priority and L pieces of quantizers, and calculates L pieces of coding-quantities.

Further the coding device sets T pieces of new coding-calculators for calculating coding-quantities with a second priority different from the first one, thereby avoiding an overflow. As a result, a stable video quality can be provided.

A program recording medium including programs and data concerning all the functions or parts of all the functions of the video-signal-coding devices discussed in embodiments 13 through 17 is also within the scope of the present invention. This medium is loaded into a computer, then the computer operates the functions of the programs.

Exemplary Embodiment 18

Figure 22:
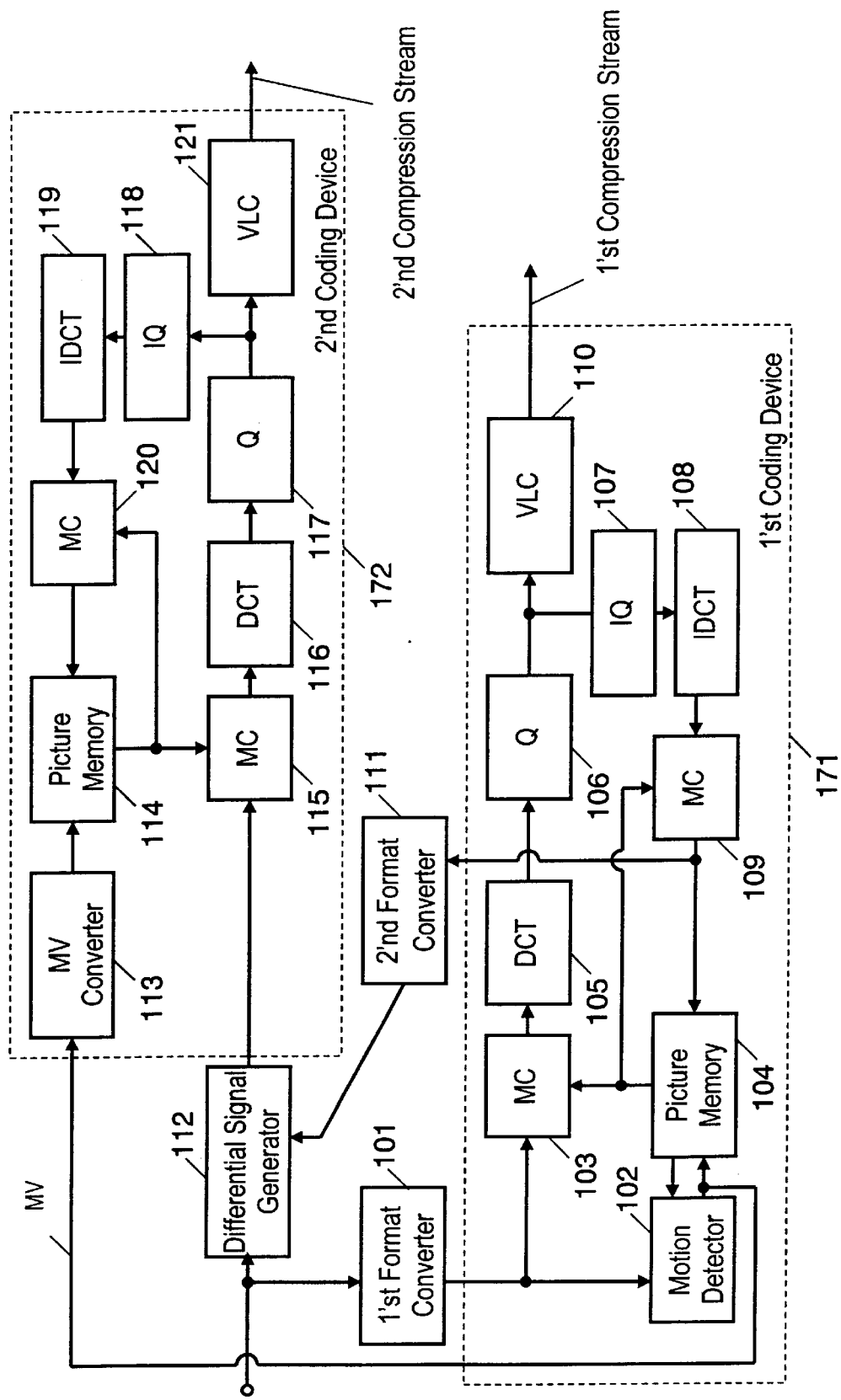
FIG. 22 is a block diagram of a video signal coding device in accordance with an 18th exemplary embodiment of the present invention.

FIG. 22 is a block diagram of a video-signal-coding device in accordance with the 18th exemplary embodiment of the present invention.

In FIG. 22, an input video signal is converted into a low resolution video signal by first format converter 101.

Motion detector 102 records the video signal tapped off from format converter 101 into picture memory 104. Further, detector 102 detects motion in each macro block (MB) using a coding frame, a video signal of a reference frame stored in picture memory 104, and decoded video signal of a reference frame. (The MB comprises 16 pixels 16 lines of a luminance signal.)

Motion compensating (MC) device 103 outputs a differential signal of a decoded video signal in a MB unit. This differential signal is derived between a video signal of a coding frame and a decoded video signal of the reference frame detected by motion detector 102.

Discrete-cosine-transform (DCT) device 105 provides DCT process to an output signal from motion compensating device 103 in each block (8 pixels×8 lines on the screen).

Quantizer (Q) 106 quantizes a DCT coefficient.

Inverse-quantizer (IQ) 107 inversely quantizes the coefficient quantized by quantizer 106.

Inverse discrete-cosine-transform (IDCT) device 108 provides the output from inverse-quantizer 107 with IDCT process.

Motion compensating (MC) device 109 adds a decoded video signal of a reference frame to the output from IDCT device 108, thereby generating a decoded video signal, and stores the signal in picture memory 104. The reference frame is compensated its motion by compensating device 103.

Variable length coding (VLC) device 110 provides a given flag including an output of quantizer 106 and a motion vector with variable length coding process.

Second format converter 111 converts the decoded video signal—an output from motion compensating device 109— into a signal of the same resolution as the input video signal.

Differential signal generator 112 generates a differential signal using an input video signal and an output from second format converter 111.

Motion-vector (MV) converter 113 converts the motion vector tapped off from motion detector 102 into the data for differential signal in a MB unit using a decoded differential signal stored in picture memory 114.

Motion compensating (MC) device 115 outputs a differential signal in a MB unit, the differential signal being derived between a differential signal of a coding frame and a signal from picture memory 114.

Discrete-cosine-transform (DCT) device 115 provides DCT process to a differential signal in each block of the output signal supplied from motion compensating device 115.

Quantizer (Q) 117 quantizes a DCT coefficient.

Inverse-quantizer (IQ) 118 inversely quantizes the coefficient quantized by quantizer 117.

Inverse discrete-cosine-transform (IDCT) device 119 provides the output from inverse-quantizer 118 with IDCT process.

Motion compensating device 120 adds a decoded differential signal of a reference frame to the output from IDCT device 119, thereby generating a decoded differential signal, and stores the signal in picture memory 114. The decoded differential signal of reference frame is compensated its motion by compensating device 115.

Variable length coding (VLC) device 121 provides an output of quantizer 117 and a given flag not including a motion vector with variable length coding process.

For instance, the following case is considered.
Input signal: a progressive signal (1080p signal)
a number of effective lines: 1080;
a number of effective pixels per line: 1920
This input signal is converted by first format converter 101 into a progressive signal (720p signal) having a lower resolution than 1080p signal:
a number of effective lines 720;
a number effective pixels per line: 1280
In this case, a motion vector is not provided to 1080p signal but provided to 720p signal. When a motion detector works on only 720p signal, both of the 720p signal and 1080p signal can be coded.

Motion vector converter 113 converts a motion vector—tapped off from motion detector 102—multiplied by 3/2 both in H and V directions following the sampling ratio of 720p signal vs. 1080p signal.

An example of a first compressed stream is an elementary video stream of MPEG. Regarding a second compressed stream, the expression per se indicates the elementary video stream of MPEG; however, it practically indicates a component of a high-resolution video signal not included in the first compressed stream. In other words, a differential signal derived between a high-resolution video signal and a decoded and format-converted signal of the first compression stream.

First format converter 101 and second format converter 111 convert a format in a reverse way with each other; however, characteristics of the filters used in both the converters can be changed.

Meanwhile, the formats of an input video signal to the first format converter and an output video signal from the second format converter are the same, and also the formats of an output video signal from the first format converter and an input video signal to the second format converter are the same.

Exemplary Embodiment 19

Figure 23:
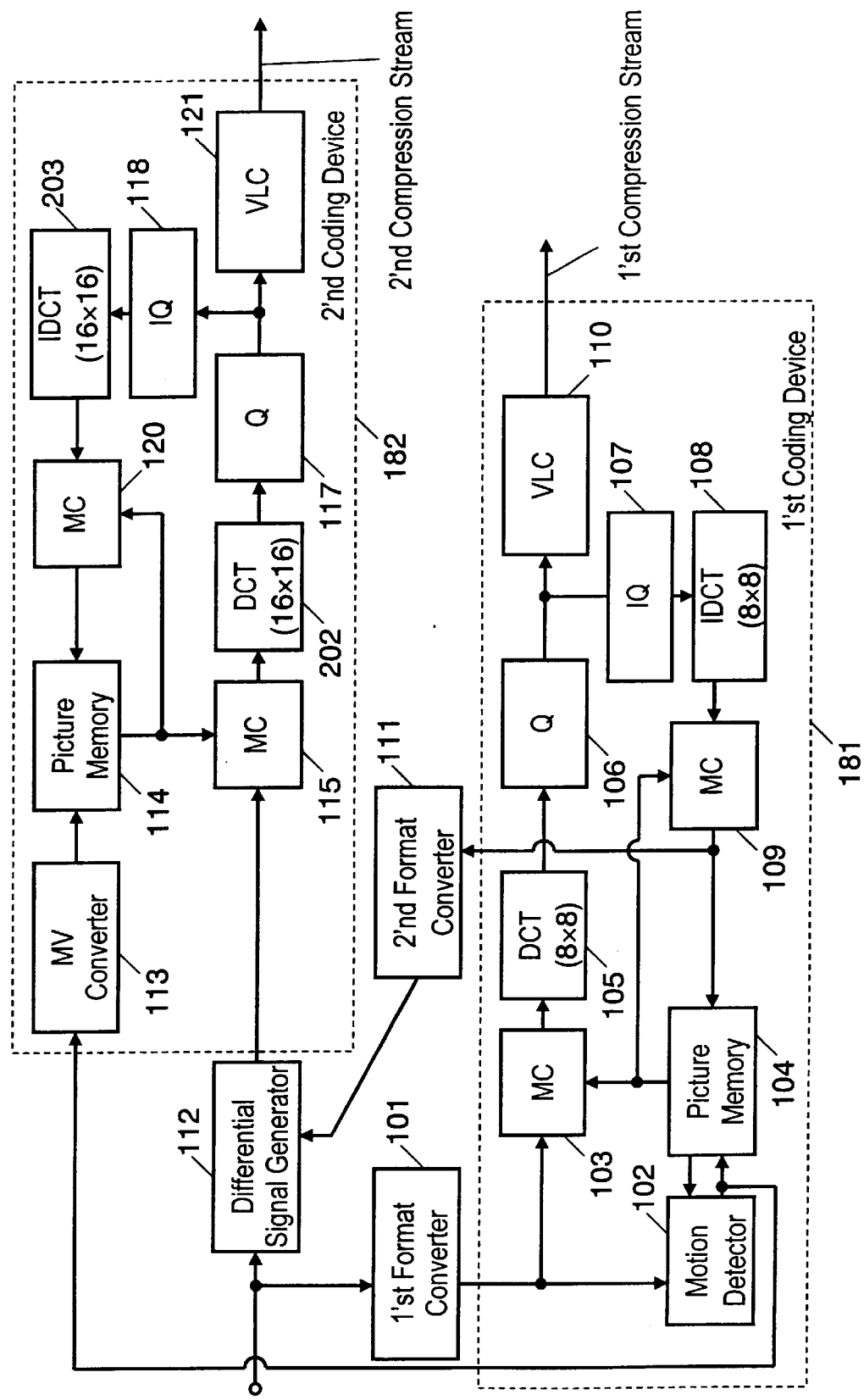
FIG. 23 is a block diagram of a video signal coding device in accordance with an 19th exemplary embodiment of the present invention.

FIG. 23 is a block diagram of a video-signal coding device in accordance with the 19th exemplary embodiment of the present invention. In FIG. 23, the blocks operating in the same way as those in FIG. 22 are denoted with the same reference numbers.

In FIG. 23, an input video signal is converted by first format converter 101 into a video signal having a lower resolution than the input signal. In order to make a long story short, the resolution is reduced to half both in H and V directions.

Motion detector 102 records an output video signal from format converter 101 into picture memory 104, and detects a motion of each MB using the coding frame, the video signals of reference frame stored in memory 104 and decoded video signals of the reference frame already coded and decoded. (This MB is formed of 16 pixels×16 lines in a luminance signal on the screen.)

Discrete-cosine-transform (DCT) device 105 provides DCT process to a differential signal in each block (8 pixels×8 lines on the screen) of the output signal supplied from motion compensating device 103.

Motion-vector-converter 113 doubles a motion vector supplied from motion-detector 102 in both H and V directions, and outputs a reference picture for a differential signal from a decoded differential signal of a reference frame stored in picture memory 114. This output is carried out in a MB unit, i.e. 32 pixels×32 lines in a luminance signal on the screen.

DCT device 202 provides the differential signal, i.e. an output from motion-compensating-device 115, with DCT process in each block (16 pixels×16 lines).

Motion compensating device 120 adds a decoded differential signal of a reference frame to the output from IDCT device 203, thereby generating a decoded differential signal, and stores the signal in picture memory 114. The reference frame is compensated its motion by compensating device 115.

(In FIG. 23, regarding the operations of blocks other than the blocks described above, refer to embodiment 18.)

The format conversion rate of 1/2 in both H and V directions is employed in this embodiment; however, resolutions in H and V directions can be independently converted at an arbitrary rate.

In general, the format conversion rates in V and H directions are N2/N1, L2/L1 (N1, N2, L1, L2 are natural numbers), and DCT and inverse DCT carried out by DCT device 105 and IDCT device 108 in a unit of M pixels×M lines. In this case, a DCT and an inverse DCT carried out respectively in a unit of (M×N1/N2) pixels×(M×L1/L2) lines by DCT device 202 and IDCT device 203.

The size of a macro block (MB) is an integral multiple of M pixels×M lines in a first efficient coding device 181, and an integral multiple of (M×N1/N2) pixels×(M×L1/L2) lines in a second efficient coding device 182.

To be more specific, when input-video-signal is 1080p signal and a lower-resolution-input-video-signal is 720p signal, N1=3, N2=2, L1=3, and L2=2.

Vector converter 113 multiplies a motion vector□an output from motion detector 102-by 3/2 in both H and V directions for its use.

When DCT device 105 and IDCT 108 carry out a DCT and an IDCT in a unit of 8 pixels×8 lines, DCT device 202 and IDCT device 203 do the same in a unit of 12 pixels×12 lines.

Exemplary Embodiment 20

Figure 24:
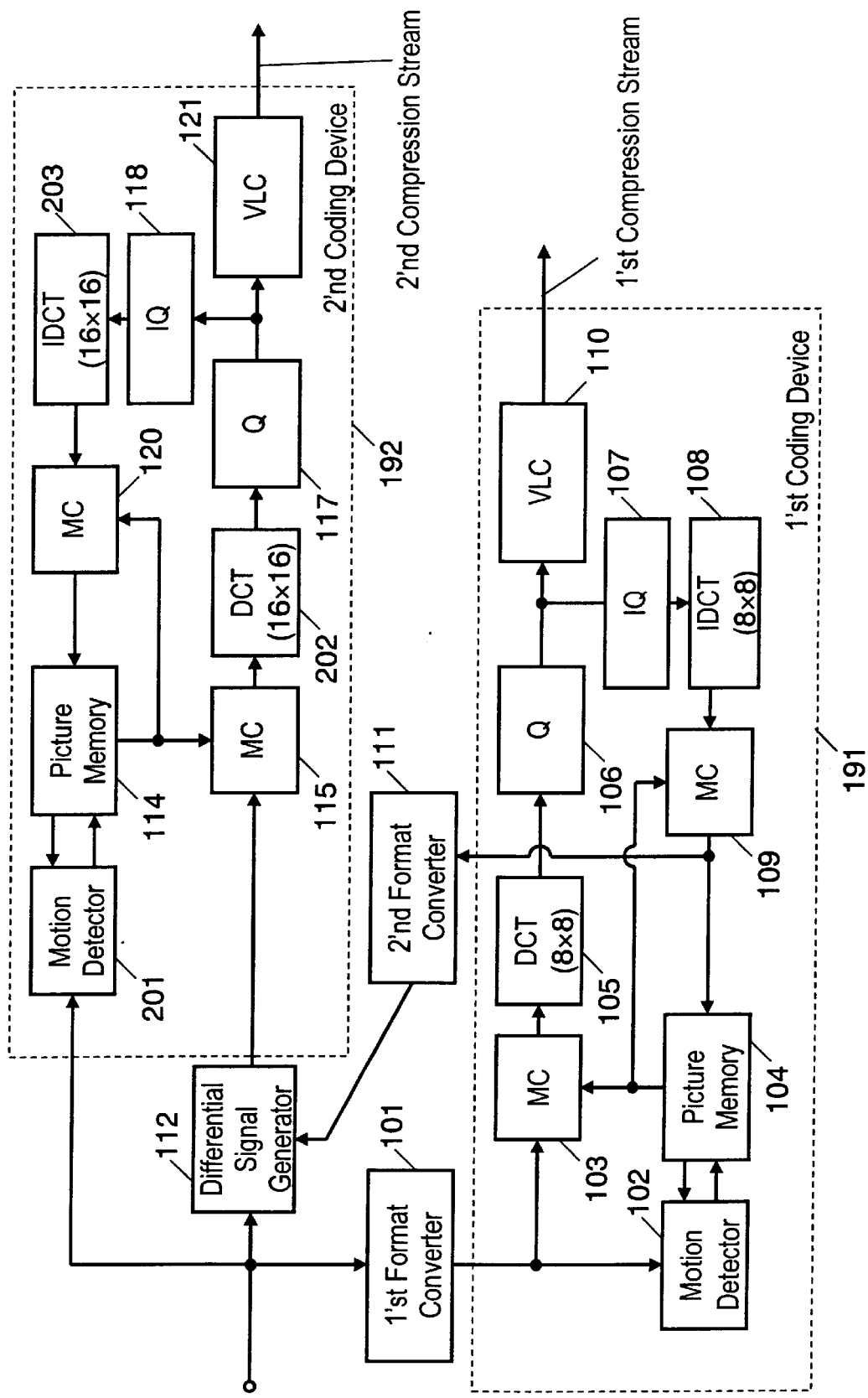
FIG. 24 is a block diagram of a video signal coding device in accordance with an 20th exemplary embodiment of the present invention.

FIG. 24 is a block diagram of a video-signal-coding device in accordance with the 20th exemplary embodiment of the present invention.

In FIG. 24, the blocks operating in the same ways as shown in FIG. 22 are denoted with the same reference numbers used in FIG. 22.

In FIG. 24, an input video signal is converted by first format converter 101 into a video signal having a lower resolution than the input signal. In order to make a long story short, the resolution is reduced to half both in H and V directions.

Motion detector 102 records an output video signal from format converter 101 into picture memory 104, and detects a motion of each MB using the coding frame, the video signals of reference frame stored in memory 104 and decoded video signals of the reference frame already coded and decoded. This MB is formed of 16 pixels×16 lines in a luminance signal on the screen.)

Motion-compensating-device 103 outputs a differential signal derived from a video signal of a coding frame and a decoded video signal of the reference frame detected by motion detector 102. The output is carried out in each MB.

DCT device 105 provides a differential signal supplied from motion compensating-device 103 with a DCT process in every block (8 pixels×8 lines on the screen).

IDCT device 108 provides an output from inverse-quantizer 107 with an inverse DCT process.

Motion detector 201 records the coding frame and differential signal of the input video signal in picture memory 114, and detects a motion of each MB (32 pixels×32 lines in a luminance signal on the screen) from the coding frame and video signals of reference frames stored in picture memory 104.

DCT device 202 provides a differential signal of an output from compensating device 115 with a DCT process in each block (16 pixels×16 lines on the screen).

Quantizer 117 quantizes a DCT coefficient, i.e. an output from DCT device 202.

IDCT device 203 provides an output from inverse-quantizer 118 with an inverse DCT process.

Motion compensating device 120 adds an output from IDCT device 203 to a decoded differential signal of the reference frame compensated by motion compensating device 115, then stores this signal into picture memory 114. (In FIG. 24, regarding the operations of blocks other than the blocks described above, refer to embodiment 18.)

The format conversion rate of 1/2 in both H and V directions is employed in this embodiment; however, resolutions in H and V directions can be independently converted at an arbitrary rate.

In general, the format conversion rates in V and H directions are N2/N1, L2/L1 (N1, N2, L1, L2 are natural numbers), and DCT and inverse DCT carried out by DCT device 105 and IDCT device 108 in a unit of M pixels×M lines. In this case, a DCT and an inverse DCT carried out respectively in a unit of (M×N1/N2) pixels×(M×L1/L2) lines by DCT device 202 and IDCT device 203.

The size of a macro block (MB) is an integral multiple of M pixels×M lines in a first efficient coding device 191, and an integral multiple of (M×N1/N2) pixels×(M×L1/L2) lines in a second efficient coding device 192.

To be more specific, when input-video-signal is 1080p signal and a lower-resolution-video-signal is 720p signal, N1=3, N2=2, L1=3, and L2=2.

When DCT device 105 and IDCT 108 carry out a DCT and an IDCT in a unit of 8 pixels×8 lines, DCT device 202 and IDCT device 203 do the same in a unit of 12 pixels×12 lines.

Exemplary Embodiment 21

Figure 25:
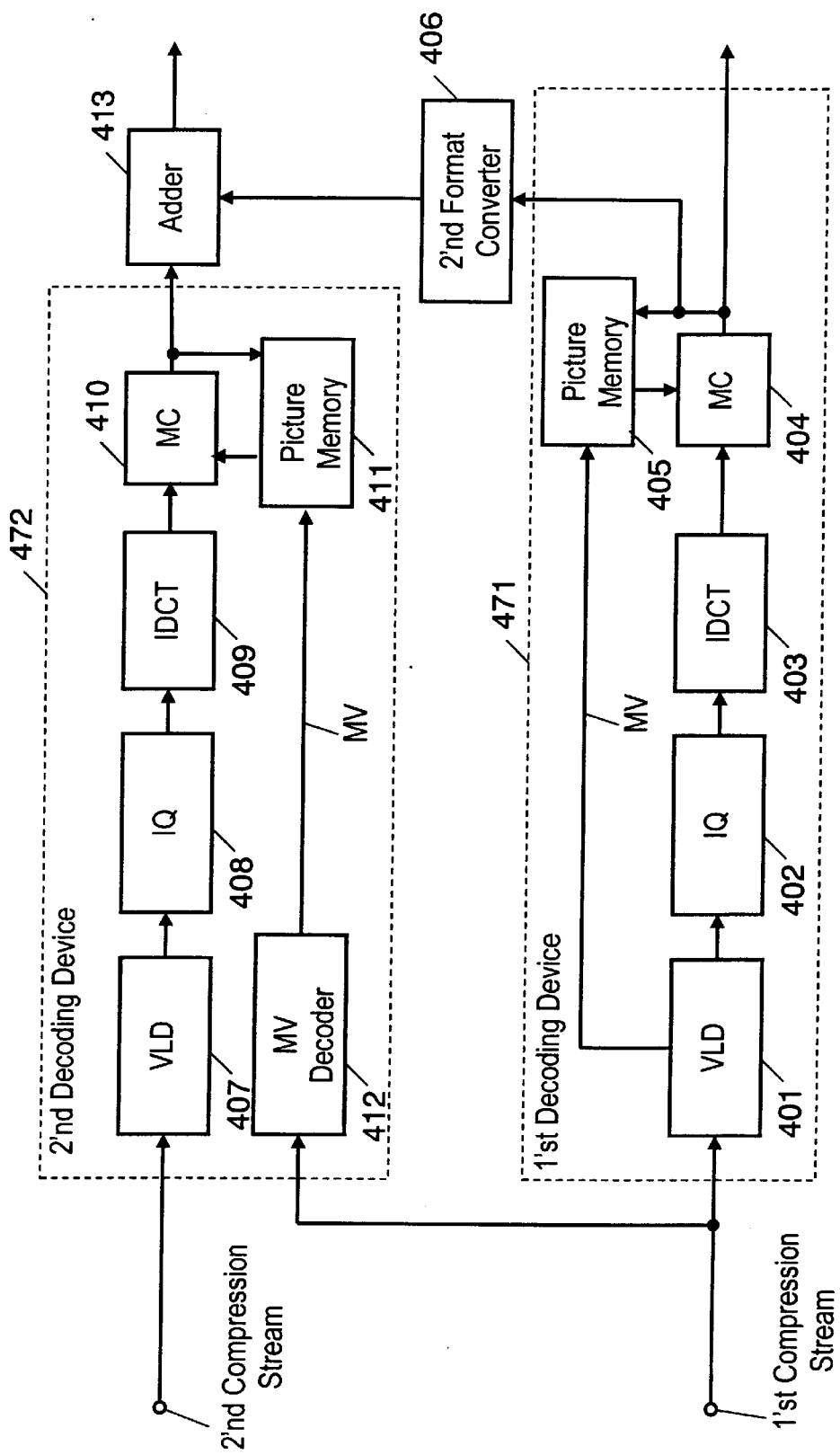
FIG. 25 is a block diagram of a video signal decoding device in accordance with an 21st exemplary embodiment of the present invention.

FIG. 25 is a block diagram of a decoding device for video signals in accordance with the 21st exemplary embodiment of the present invention. This embodiment demonstrates a decoding device corresponding to the coding devices demonstrated in embodiments 18 and 19.

In FIG. 25, variable-length-decoder (VLD) 401 decodes a first compressed stream in a given manner, then outputs a motion vector and the decoded signal.

Inverse quantizer (IQ) 402 inversely quantizes the signal decoded by decoder 401 in the given quantizing step, and outputs a DCT coefficient. IDCT device 403 provides the DCT coefficients with IDCT process.

Motion compensating (MC) device 404 adds an output from IDCT device 403 to a decoded video signal of the reference frame designated by the motion vector (MV), and stores the resultant addition into picture memory 405.

Second format converter 406 converts the format of decoded-video-signal.

Variable length decoder (VLD) 407 decodes a second compressed stream in a given manner.

Inverse quantizer (IQ) 408 inversely quantizes the signal decoded by decoder 407 in the given quantizing step, and outputs a DCT coefficient.

IDCT device 409 provides the DCT coefficients with IDCT process.

Motion-vector-decoder 412 decodes a motion vector from the first compressed stream, and converts the vector in a given manner, then outputs the vector as a motion vector for the second compressed stream.

Motion compensating (MC) device 410 adds an output from IDCT device 409 to a decoded-differential-signal of the frame designated by the motion vector—an output from motion vector (MV) decoder 412—to produce a decoded differential signal, then stores the produced signal into picture memory 411.

Adding device (Adder) 413 adds an output signal from the compensating device 410 to an output signal from second format converter 406, so that a decoded-video-signal of the first video signal is produced.

Meanwhile, when resolution ratios in H vs. V directions are N2/N1, and L2/L1 (N1, N2, L1 and L2 are natural numbers), and assuming that IDCI device 403 carries out IDCT process at is M×M, IDCT device 209 desirably carries out an IDCT process at (M×N1/N2)×(M×L1/L2).

To be more specific, when high-resolution-video-signal 1080p is decoded by second decoder 472 and low-resolution-video-signal 720p is decoded by first decoder 471, N1=3, N2=2, L1=3, and L2=2 are satisfied.

Motion-vector-decoder 412 multiplies the motion vector in the first compressed stream by 3/2 both in H and V directions.

Assume that IDCT device 403 inversely transforms with respect to 8×8 DCT, then it can be assumed that IDCT device 409 inversely transforms with respect to 12×12 DCT.

Exemplary Embodiment 22

Figure 26:
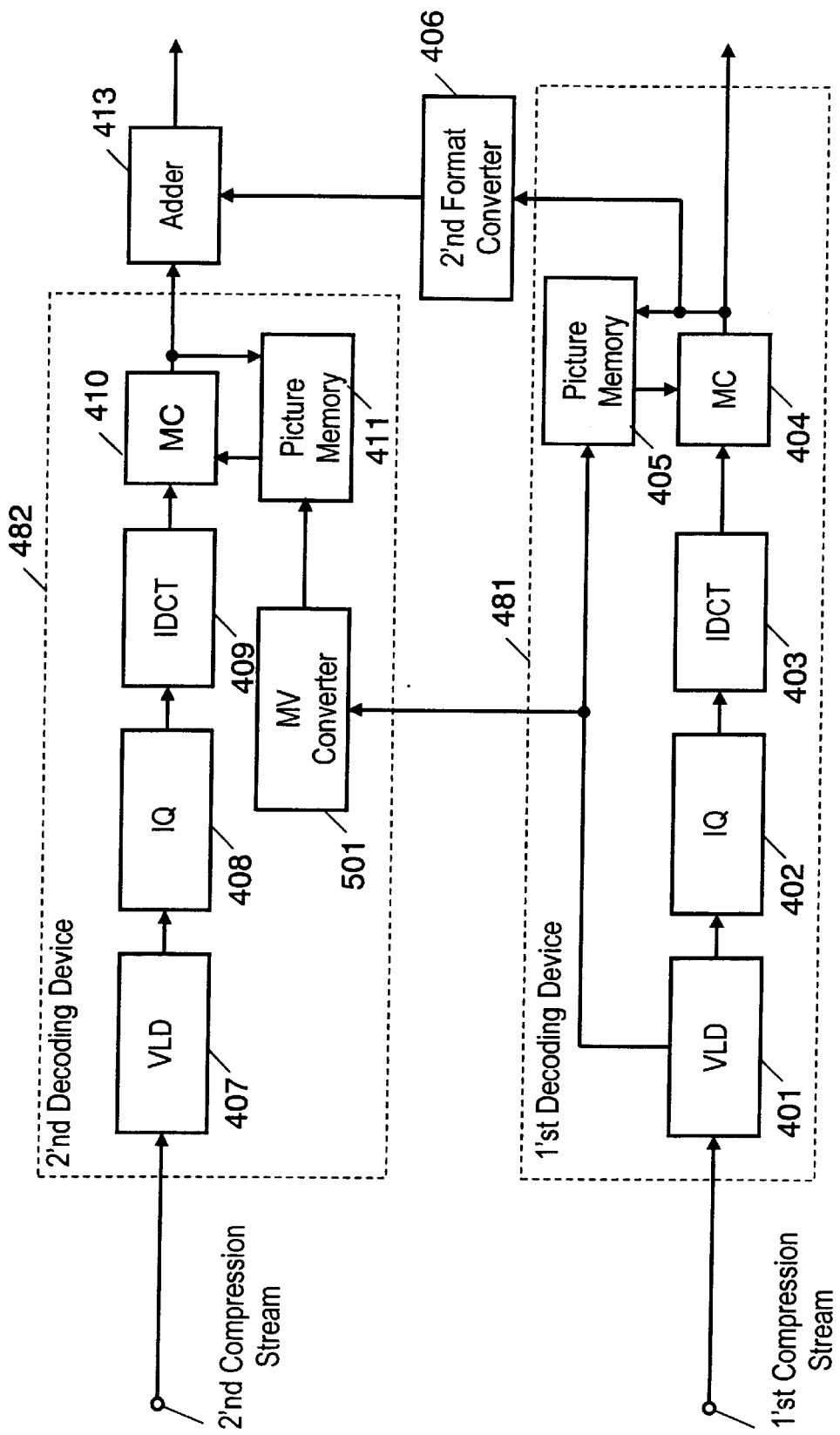
FIG. 26 is a block diagram of a video signal decoding device in accordance with an 22nd exemplary embodiment of the present invention.

FIG. 26 is a block diagram of a video-signal-decoder in accordance with the 22nd exemplary embodiment of the present invention. In FIG. 26, the blocks operating in the same way as those in FIG. 25 are denoted with the same reference numbers used in FIG. 25.

This embodiment demonstrates a decoding device corresponding to the coding devices demonstrated in embodiments 18 and 19.

Motion vector (MV) converter 501 converts a motion vector—an output from variable length decoder (VLD) 401 in a given manner, then outputs the motion vector for the second compressed stream.

Motion compensating (MC) device 410 adds an output from IDCT device 409 to a decoded differential signal of the reference frame designated by the motion vector an output from motion vector converter 501 so that a decoded differential signal is produced, then stores the produced signal into picture memory 411.

Adding device 413 adds the decoded differential signal to the decoded video signal an output signal from the second format converter 406, so that a decoded-video-signal of the first video signal is produced.
(Regarding the blocks other than the blocks described above, refer to embodiment 21)

Meanwhile, when resolution ratios in H vs. V directions are N2/N1, and L2/N1, and L2/L1 (N1, N2, L1 and L2 are natural numbers), and assuming that the IDCT process carried out by IDCT device 403 carries out IDCT process at M×M, IDCT device 409 desirably carries out an IDCT process at (M×N1/N2)×(M×L1/L2).

To be more specific, when high-resolution-video-signal 1080p is decoded by second decoder 482 and low-resolution-video-signal 720p is decoded by first decoder 481, N1=3, N2=2, L1=3, and L2=2 are satisfied.

Motion-vector-converter 501 multiplies the motion vector, an output from variable-length-decoder 401 by 3/2 both in H and V directions.

Assume that IDCT device 403 inversely transforms with respect to 8×8 DCT, then it can be assumed that IDCT device 409 inversely transforms with respect to 12×12 DCT.

Exemplary Embodiment 23

Figure 27:
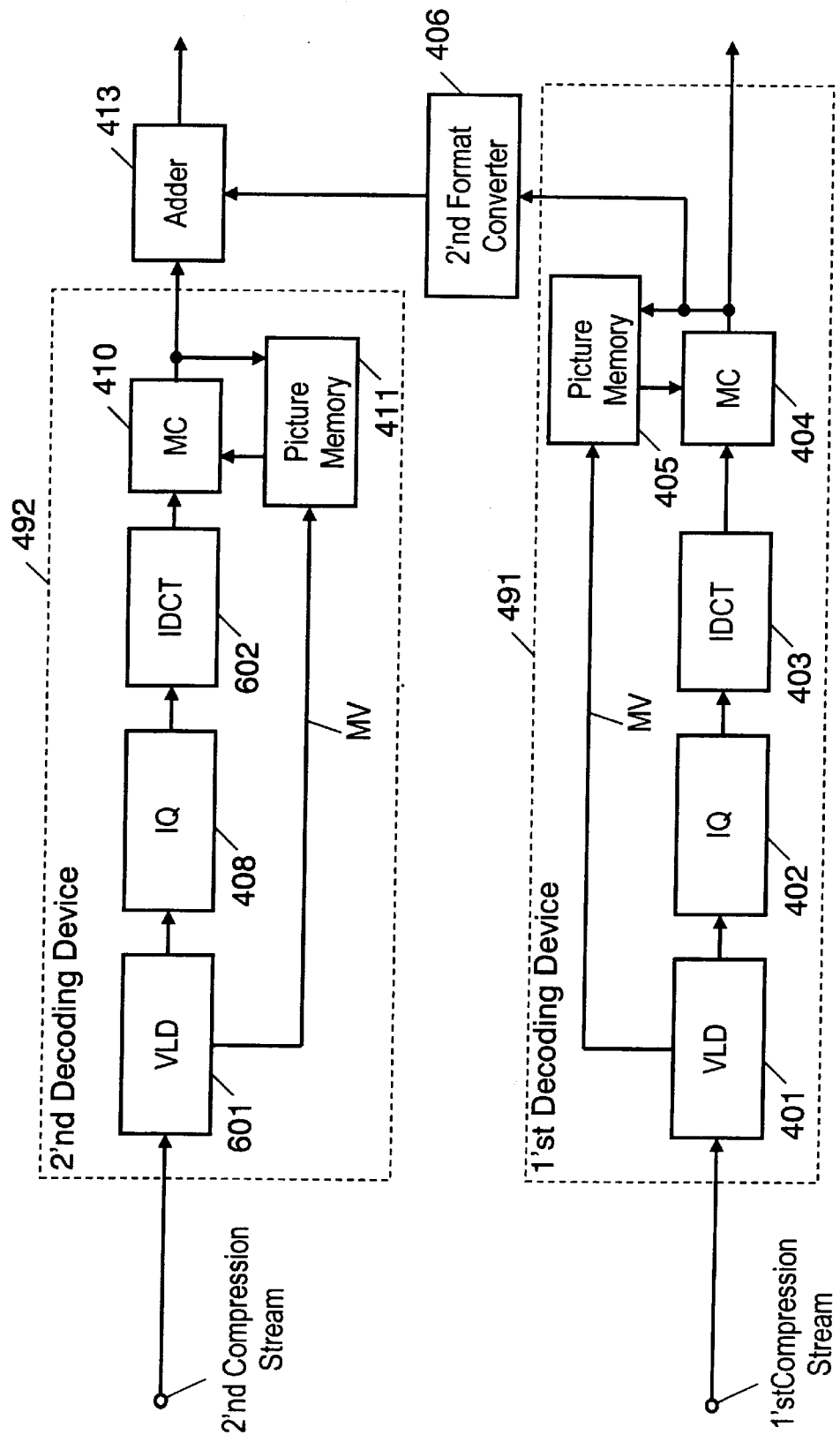
FIG. 27 is a block diagram of a video signal decoding device in accordance with an 23rd exemplary embodiment of the present invention.
Figure 28:
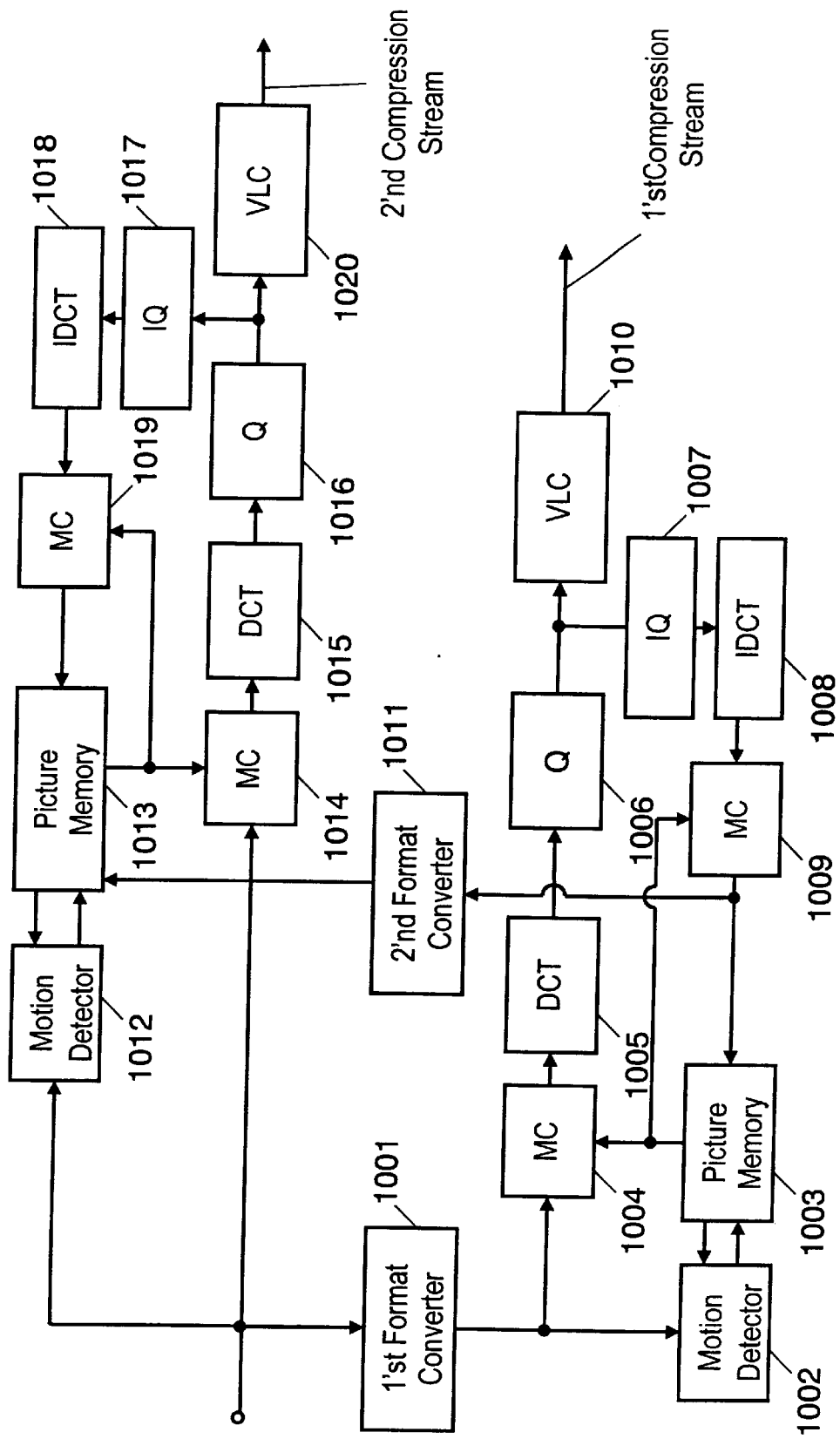
FIG. 28 is a block diagram of a conventional video-signal-hierarchical-coding device.
Figure 29:
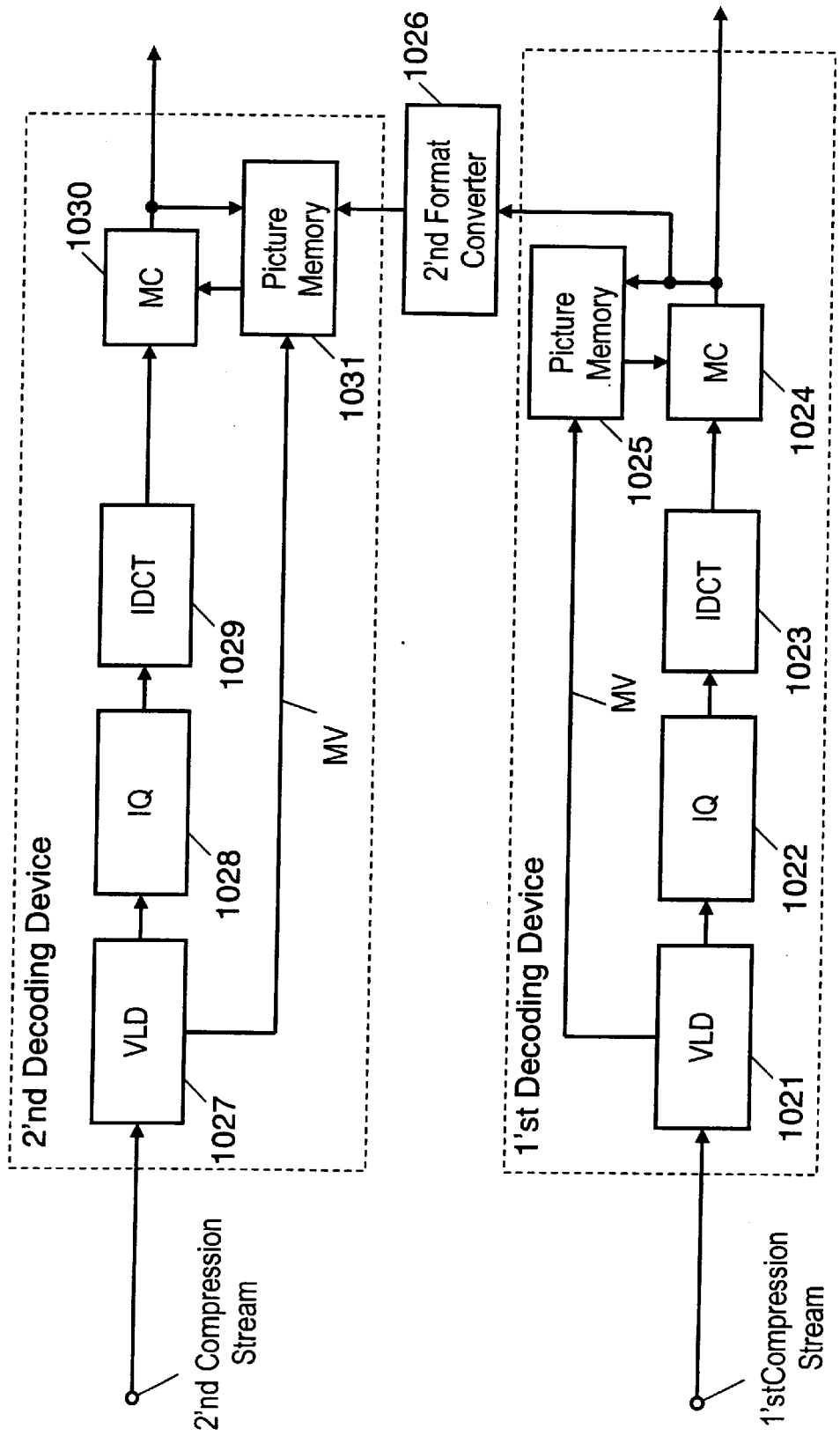
FIG. 29 is a block diagram of a conventional video-signal-hierarchical-decoding device.

FIG. 27 is a block diagram of a video-signal-decoder in accordance with the 23rd exemplary embodiment of the present invention. In FIG. 27, the blocks operating in the same way as those in FIG. 25 are denoted with the same reference numbers used in FIG. 25.

This embodiment demonstrates a decoding device corresponding to the coding devices demonstrated in e.g. embodiment 20.

IDCT device 403 carries out an inverse transform with respect to 8×8 DCT.

Second format converter 406 converts a format of a decoded video-signal.

In order to make a long story short, the resolution is doubled both in H and V directions.

Variable-length-decoder 601 decodes the second compressed stream in a given manner, then outputs a motion vector and the decoded signal.

Inverse quantizer 408 inversely quantizes the decoded signal in the given quantizing step, then outputs a DCT coefficient.

IDCT device 602 inversely transforms the DCT—coefficient with respect to 16×16 DCT.

Motion compensating device 410 adds an output from IDCT device 409 to a decoded differential signal of the reference frame designated by the motion vector—an output from variable length decoder 601so that a decoded differential signal is produced, then stores the resultant signal into picture memory 411.

Adding device 413 adds the decoded differential signal to the decoded video signal—an output signal from the second format converter 406, so that a decoded-video-signal of the first video signal is produced.

In this embodiment, format conversion ratio of 1/2 is used; however an arbitrary conversion ratio in both H and V direction can be used.

In general, when resolution ratios in H vs. V directions are N2/N1, and L2/L1 (N1, N2, L1 and L2 are natural numbers), and assuming that IDCT device 403 carries out at M×M, IDCT device 409 carries out an IDCT process at (M×N1/N2)×(M×L1/L2).

To be more specific, when high-resolution-video-signal 1080p is decoded by second decoder 492 and low-resolution-video-signal 720p is decoded by first decoder 491, N1=3, N2=2, L1=3, and L2=2 are satisfied.

Assume that IDCT device 403 inversely transforms with respect to 8×8 DCT, then it can be assumed that IDCT device 409 inversely transforms with respect to 12×12 DCT.

The embodiments 18 through 23 prove that the video-signal-coding device coding a video signal hierarchically and the video-signal decoder of the present invention effect the following advantages:

(1) In coding a low-resolution video signal, because a motion vector detected is utilized for coding a differential signal of high resolution, one motion detector can deal with this process. Since a second compressed stream does not include information about a motion vector, a video signal can be more efficiently coded in a hierarchical manner than a conventional decoding device did.

(2) An orthogonal conversion having a resolution ratio identical to that of the low-resolution video signal is used for coding a high-resolution differential signal. This allows efficient and hierarchical coding of high-picture-quality free from crossing the distortion due to compression. This advantage is achieved because the segments of both the high-resolution-video signal and the low-resolution-video signal agree with each other on the screen.

(3) Since the decoder of the present invention includes a motion-vector-decoder, a coded and compressed stream can be decoded by a simple structure.

(4) Since the decoder of the present invention includes a motion-vector-converter, a coded and compressed stream can be decoded by a simple structure.

(5) Since the decoder of the present invention includes IDCT device 602, a coded and compressed stream can be decoded by a simple structure.

The embodiments 18 through 23 prove that all the elements or parts of the video-signal-coding devices may be actualized in a hardware form or a software form operating the same functions as the hardware does.

A program recording medium including programs and data concerning all the functions or parts of all the functions of the video-signal-coding devices or decoders discussed in embodiments 18 through 23 is also within the scope of the present invention. This medium is loaded into a computer, then thin computer operates the functions of the programs.

What is claimed is:

1. A video signal shuffling device comprising:
    a divider for dividing a frame of an input video signal into a plurality of blocks;
    a rearranging device for rearranging ones of said plurality of blocks;
    a segment creator for:
        a) dividing the plurality of blocks, including said ones of said plurality of blocks which have been rearranged, into a plurality of regions,
        b) forming segments from said regions each comprising respective reference blocks of said plurality of blocks, and respective further blocks offset from said reference blocks by common offsets relative to said segments, and
        c) outputting said segments on respectively different channels.

2. The video signal shuffling device as defined in claim 1 further comprising a format converter for converting a resolution of the input video signal, wherein said divider divides the video signal, whose format is converted by said format converter, into a plurality of blocks.

3. The video signal shuffling device as defined in claim 2 wherein said divider divides one frame, whose format has been converted, into region 1 of said regions and region 2 of said regions;
    said divider divides a luminance signal of the region 1 with a block formed of 2h×2v pixels (h, v: positive integers) as well as divides a color difference signal with a block formed of h×2v pixels; and
    said divider divides a luminance signal of the region 2 with a block formed of 4h×v pixels as well as divides a color difference signal with a block formed of 2h×v pixels,
    wherein said rearranging device changes ones of said blocks in the region 1, and changes ones of said blocks in the region 2,
    wherein said segment creator divides the changed blocks into ones of said regions formed of Ms×Ns blocks, where Ms represents a number of blocks in horizontal direction and a multiple of Lh which is an integer not less than 2, Ns represents a number of blocks in a vertical direction and a multiple of Lv which is an integer not less than 2,
    wherein one of said segments is formed of Lh pieces of luminance signal blocks not adjacently disposed with each other and 2Lh pieces of color difference signal blocks located on a same position as the luminance signal blocks.

4. The video-signal shuffling device as defined in claim 3, wherein a horizontal offset value Hoff and a vertical offset value Voff of a block with respect to the block at the reference position are expressed;

$$H\text{off}=\text{MOD}(k \times Ms/Lh, Ms)$$

$$V\text{off}=\text{MOD}(k \times p \times Ns/Lv, Ns)$$

where k=1, 2 ..., Lh−1, p is an positive integer satisfying MOD(p, Lv)≠0 and MOD(Lv, p)≠0, and MOD is a surplus computing function.

5. The video-signal shuffling device as defined in claim 4, wherein a horizontal location and a vertical location of "n"th segment ("n": a positive integer) created by said segment creator are expressed:

$$Hn=\text{MOD}[H1+\text{INT}\{(n-1)/Lv\}, Ms/Lh]$$

$$Vn=\text{MOD}[V1+Ns/Lv \times \text{MOD}(n-1, Lv)+\text{INT}\{(n-1)/Lv/(Ms/Lh)\}, Ns]$$

where H1, V1 represent a horizontal and vertical locations of a block when n=1, and INT represents a computing function for omitting decimals.

6. The video-signal shuffling device as defined in claim 4, wherein a horizontal location and a vertical location of "n"th segment ("n": a natural number) created by said segment creator are expressed:

$$Hn=\text{MOD}[H1+\text{INT}\{(n31\ 1)/(Ns/Lv)\}, Ms/Lh]$$

$$Vn=(Ns/Lv) \times \text{MOD}[\text{INT}\{V1/(Ns/Lv)\}+\text{INT}\{(n-1)/(Ms/Lh)/(Ns/Lv)\}, Lv]+\text{MOD}(Hn+1, 2) \times \text{MOD}\{V1+(n-1), (Ns/Lv)\}+\text{MOD}(Hn, 2) \times \text{MOD}[(Ms/Lh) \times (Ns/Lv)-\text{MOD}\{Ci+n, (Ms/Lh) \times (Ns/Lv)\}, (Ns/Lv)]$$

where Ci=(Ns/Lv)−MOD{V1, (Ns/Lv)}, and H1, V1 represent a horizontal and vertical locations of a block when n=1, and INT represents a computing function for omitting decimals.

7. The video signal shuffling device as defined in claim 5, wherein the input video signal comprises:
  a luminance signal having 1920 pixels horizontally effective and 1080 lines vertically effective; and
  a color difference signal having 960 pixels horizontally effective and 1080 lines vertically effective,
  wherein said format converter converts the 1920 pixels of the luminance signal into 1280 pixels, and the 960 pixels of the color difference signal into 640 pixels,
  wherein the region 1 contains 1072 lines out of the 1080 lines and region 2 contains remaining 8 lines out of the 1080 lines,
  wherein said divider divides the luminance signal of the region 1 into blocks, each block formed of 16 pixels (H)×16 pixels (V), and the color difference signal of the region 1 into blocks, each block formed of 8 pixels (H)×16 pixels (V), where (H) and (V) stand for horizontal and vertical directions respectively, as well as divides the luminance signal of the region 2 into blocks, each block formed of 32 pixels (H)×8 pixels (V), and divides the color difference signal of region 2 into blocks, each block formed of 16 pixels (H)×8 pixels (V),
  wherein said rearranging device changes an array of blocks in the region 1, and changes an array of blocks as well as an array of pixels in each of the blocks in the region 2, then combines the blocks in region 1 and region 2 so that each frame of the luminance signal and the color difference signal comprises 90 blocks (H)×60 blocks (V),
  wherein said segment creator creates four regions, each region having Ms=45, Ns=30, and creates a segment having Lh=5.

8. A program recording medium on which is stored a program, said program performing a method comprising the steps of:
  dividing an input video signal into a plurality of blocks per frame;
  rearranging the blocks divided in a frame;
  creating a segment using a plurality of blocks rearranged in said rearranging step;
  wherein said creating step includes the steps of:
    dividing the blocks—rearranged in said rearranging step—in the frame into a plurality of regions;
    creating segments from said regions each comprising respective reference blocks and respective further blocks of said plurality of blocks, said respective further blocks offset from said reference blocks by common offsets relative to said segments;
  supplying the segments to a plurality of respective channels.

9. A program recording medium according to claim 8, wherein, said method further comprises the steps of:
  format converting for converting a resolution of the input video signal,
  wherein in said dividing step, one frame of the video signal converted in said format converting step is divided into said plurality of blocks.

10. A video-signal-shuffling device comprising:
  a divider for dividing an input video signal into a plurality of blocks per frame;
  a segment creator for creating a segment using the blocks in the frame,
  wherein said divider divides one frame into region 1 and region 2, and further divides the region 1 and the region 2,
  wherein said segment creator divides the blocks in the region 1 into a plurality of regions, each region formed of Ms×Ns blocks, where Ms represents a number of blocks (H) and is a multiple of Lh which is an integer not less than 2, Ns represents a number of blocks (V) and is a multiple of Lv which is an integer not less than 2, (H) and (V) representing horizontal and vertical directions respectively, said segment creator forming segments from said regions each comprising respective reference blocks and respective further blocks of said plurality of blocks, said respective further blocks offset from said reference blocks by common offsets relative to said segments, then supplies the segments respectively created in the plurality of regions to a plurality of respective channels, said creator further creates a segment combining the blocks in the region 2, the blocks having predetermined offset values in (H) and (V), then supplies the segment to a predetermined channel.

11. The video-signal-shuffling device as defined in claim 10 further including a format converter for converting a resolution of the input video signal,
  wherein said divider divides one frame of the video signal converted by said format converter into region 1 and region 2, and further divides the region 1 and region 2 into a plurality of blocks.

12. The video signal shuffling device as defined in claim 11, wherein the input video signal comprises:
  a luminance signal having 1920 pixels horizontally effective and 1080 lines vertically effective; and a color difference signal having 960 pixels horizontally effective and 1080 lines vertically effective, wherein said format converter converts the 1920 pixels of the luminance signal into 1440 pixels, and the 960 pixels of the color difference signal into 720 pixels, wherein the region 1 contains 1056 lines out of the 1080 lines and region 2 contains remaining 24 lines out of the 1080 lines, wherein said divider divides the luminance signal of the region 1 into said blocks, each block formed of 16 pixels (H)×16 pixels (V), and the color difference signal of the region 1 into blocks, each block formed of 8 pixels (H)×16 pixels (V), where (H) and (V) stand for horizontal and vertical directions respectively, further divides the region 2 into region 2a including 16 lines and region 2b including 8 lines, said divider also divides the luminance signal of the region 2a into blocks, each block formed of 32 pixels (H)×8 pixels (V), and divides the color difference signal of region 2b into blocks, each block formed of 16 pixels (H)×8 pixels (V), wherein said segment creator divides the region 1 into four regions having Ms=45 and Ns=33, and forms a segment on the respective four regions using 5 blocks of a luminance signal and 10 blocks of a color difference signal positioned at the same location of the 5 blocks on the screen, and further forms a block on the region 2 using five blocks of a luminance signal, the respective 5 blocks being not adjacently arranged with each other, and 10 blocks of a color difference signal, the 10 blocks being at the same location as the 5 blocks on the screen of the region 2.

13. The video-signal-shuffling device as defined in claim 12, wherein a horizontal offset value Hoff and a vertical offset value Voff of a block with respect to the block at the reference position in the five blocks forming the segment in the region 1 are expressed as (Hoff, Voff)=(9, 18), (18, 6), (27, 24), and (36, 12).

14. The video-signal shuffling device as defined in claim 13, wherein a horizontal location and a vertical location of "n"th segment ("n": a positive integer) created by said segment creator are expressed:

$Hn=\text{MOD}[H1+\text{INT}\{(n-1)/Lh\}, Ms/Lh]$ $Vn=\text{MOD}[V1+Ns/Lv\times\text{MOD}(n-1, Lv)+\text{INT}\{(n-1)/Lv/(Ms/Lh)\}, Ns]$ where H1, V1 represent a horizontal and vertical locations of a block when n=1, and INT represents a computing function for omitting decimals.

15. A program recording medium on which is stored a program, said program performing a method comprising the steps of:

dividing an input video signal into a plurality of blocks per frame;

creating a segment comprising a plurality of blocks in the frame;

wherein said dividing step includes the step of dividing the one frame into region 1 and region 2, and further dividing the region 1 and region 2 into a plurality of blocks, wherein said creating step of a segment includes the step of dividing the block of the region 1 into a plurality of regions, and forming segments from said regions each comprising respective reference blocks and respective further blocks of said plurality of blocks, said respective further blocks offset from said reference blocks by common offsets relative to said segments; and supplying the segments respectively created in the plurality of regions to a plurality of channels responsive to the plurality of regions, said creating step further including the step of creating a segment combining the blocks in the region 2, the blocks having predetermined offset values in (H) and (V), then supplying the segment to a predetermined channel.

16. A program recording medium according to claim 15, said method further comprising the step of format converting for converting a resolution of the input video signal, wherein in said dividing step, one frame of the video signal converted in said format converting step is divided into region 1 and region 2, and the region 1 and the region 2 are further divided into a plurality of blocks.

17. A video-signal-shuffling device comprising:

a divider for dividing an input video signal of a progressive scan method into a plurality of blocks per frame;

a segment creator for creating segments comprising the blocks, wherein said segment creator divides the blocks of one frame into at least one region, each region formed of Ms×Ns blocks, where Ms represents a number of blocks (H) and is a multiple of Lh which is an integer not less than 2, Ns represents a number of blocks (V) and is a multiple of Lv which is an integer not less than 2, (H) and (V) representing horizontal and vertical directions respectively, and forms a plurality of regions, each region being formed of at least one frame, said segment creator creates a segment in the respective regions using Lh pieces of luminance-signal-blocks, not adjacently positioned with each other, and 2Lh pieces of color-difference-signal-blocks at the same position as the Lh pieces of blocks, and further creates a further segment using one block being at the reference position in the Lh pieces of blocks and another block having a same offset value as the one block at the reference position and being in the plurality of regions, said segment and said further segment output on respectively different channels.

18. The video-signal-shuffling device as defined in claim 17 further including a format converter for converting a resolution of the input video signal, wherein in said divider divides one frame of the video signal converted by said format converter into a plurality of blocks.

19. The video-signal shuffling device as defined in claim 17 or 18, wherein a horizontal offset value Hoff and a vertical offset value Voff of a block with respect to the block at the reference position are expressed;

i Hoff=MOD($k\times Ms/Lh$, Ms)

i Voff=MOD($k\times p\times Ns/Lv$, Ns)

where k=1, 2, Lh-1, p is an integer satisfying MOD(p, Lv)≠0 and MOD(Lv, p)≠0, and MOD is a surplus computing function.

20. The video-signal-shuffling device as defined in claim 19, wherein a horizontal location and a vertical location of "n"th segment ("n": a positive integer) created by said segment creator are expressed:

$Hn=\text{MOD}[H1+\text{INT}\{(n-1)/Lv\}, Ms/Lh]$ $Vn=\text{MOD}[V1+Ns/Lv\times\text{MOD}(n-1, Lv)+\text{INT}\{(n-1)/Lv/(Ms/Lh)\}, Ns]$ where H1, V1 represent a horizontal and vertical locations of a block when n=1, and INT represents a computing function for omitting decimals.

21. The video-signal-shuffling device as defined in claim 20, wherein said segment creator divides blocks (H) in one frame into 2Lh pieces of small regions, and creates two regions, a first region being formed of even numbered small regions and a second region being formed of odd numbered small regions, said segment creator creates a segment using two frames.

22. The video-signal-shuffling device as defined in claim 20, wherein the Lh equals the Lv, i.e. Lh=Lv, and said segment creator creates a segment using two frames where blocks forming the segment are at the same position in the two frames on a screen.

23. The video signal shuffling device as defined in claim 20, wherein the input video signal comprises:
a luminance signal having 1280 pixels horizontally effective and 720 lines vertically effective; and
a color difference signal having 640 pixels horizontally effective and 720 lines vertically effective,
wherein said format converter converts the 1280 pixels of the luminance signal into 960 pixels, and the 640 pixels of the color difference signal into 480 pixels,
wherein said divider divides the luminance signal into blocks, each block formed of 16 pixels (H)×16 pixels (V), and the color difference signal into blocks, each block formed of 8 pixels (H)×16 pixels (V), where (H) and (V) stand for horizontal and vertical directions respectively, so that the luminance signal and color difference signal comprises respectively 60 blocks (H)×45 blocks (V),
wherein said segment creator divides one frame into two regions having Ms=30, Ns=45, and creates a segment having Lh=5, Lv=5.

24. The video-signal-shuffling-device as defined in claim 20, wherein the input video signal comprises:
a luminance signal having 720 pixels horizontally effective and 480 lines vertically effective; and
a color difference signal having 360 pixels horizontally effective and 480 lines vertically effective,
wherein said divider divides the luminance signal into blocks, each block formed of 16 pixels (H)×16 pixels (V), and the color difference signal into blocks, each block formed of 8 pixels (H)×16 pixels (V), so that the luminance signal and color difference signal comprises respectively 45 blocks (H)×30 blocks (V),
wherein the Ms=45 and the Ns=30 are satisfied, and
wherein said segment creator satisfies Lh=5 and Lv=5.

25. A method of storing a program or a program recording medium, said method comprising the steps of:
dividing an input video signal of a progressive-scan-method into a plurality of blocks per frame; and
creating a segment comprising a plurality of blocks;
wherein said creating step of said segment includes the step of dividing the blocks of one frame into at least one region, each region formed of Ms×Ns blocks, where Ms represents a number of blocks (H) and is a multiple of Lh which is an integer not less than 2, Ns represents a number of blocks (V) and is a multiple of Lv which is an integer not less than 2, (H) and (V) representing horizontal and vertical directions respectively, and forms a plurality of regions, each region being formed of at least one frame,
said segment creating step further includes the step of forming segments from said regions each comprising respective reference blocks and respective further blocks of said plurality of blocks, said respective further blocks offset from said reference blocks by common offsets relative to said segments,
said segments output on respectively different channels.

26. The method as defined in claim 25 further including the step of format converting for converting a resolution of the input video signal, wherein in said dividing step, the video signal converted in said format converting step is further divided into ones of said blocks.

27. A video signal shuffling device comprising:
(a) a format converter for converting a video signal of a progressive scan method, the signal including:
a luminance signal having:
1280 pixels horizontally effective (H);
720 lines vertically effective (V),
a color difference signal having:
640 pixels horizontally effective (H);
720 lines vertically effective (V),
into a video signal including:
a luminance signal having:
960 pixels (H);
a color difference signal having:
240 pixels (H);
(b) a divider for dividing the video signal converted by said format convert into plurality of blocks per frame, where each block of the luminance signal is formed of 32 pixels (H)×8 pixels (V), each block of the color difference signal is formed of 8 pixels (H)×8 pixels (V),
wherein a segment is formed of five blocks of a luminance signal, the respective 5 blocks being apart from each other, and 10 blocks of a color difference signal, the 10 blocks being at the same location as the 5 blocks on the screen.

28. A video signal shuffling device comprising:
(a) a format converter for converting a video signal of a progressive scan method, the signal including:
a luminance signal having:
1280 pixels horizontally effective (H);
720 lines vertically effective (V),
a color difference signal having:
640 pixels horizontally effective (H);
720 lines vertically effective (V),
into a video signal including:
a luminance signal having:
960 pixels (H);
a color difference signal having:
480 pixels (H);
360 lines (V),
(b) a divider for dividing the video signal converted by said format convert into plurality of blocks per frame, where each block of the luminance signal is formed of 16 pixels (H)×16 pixels (V), each block of the color difference signal is formed of 8 pixels (H)×8 pixels (V),
wherein a segment is formed of five blocks of a luminance signal, the respective 5 blocks being apart from each other, and 10 blocks of a color difference signal, the 10 blocks being at the same location as the 5 blocks on the screen.

* * * * *

UNITED STATES PATENT AND TRADEMARK OFFICE
CERTIFICATE OF CORRECTION

PATENT NO.    : 6,847,685 B1
DATED         : January 25, 2005
INVENTOR(S)   : Fujiwara et al.

It is certified that error appears in the above-identified patent and that said Letters Patent is hereby corrected as shown below:

<u>Column 29,</u>
Line 26, "Hn = MOD [H1 + INT{(n31 1)/(Ns/Lv)}, Ms/Lh]" should read -- Hn = MOD [H1 + INT{(n-1)/(Ns/Lv)}, Ms/Lh] --.

<u>Column 32,</u>
Line 55, "i Hoff = MOD (k x Ms/Lh, Ms)" should read -- Hoff = MOD (k x Ms/Lh, Ms) --.
Line 56, "i Voff = MOD (k x p x Ns/Lv, Ns)" should read -- Voff = MOD (k x p x Ns/Lv, Ns) --.

Signed and Sealed this

Twenty-sixth Day of July, 2005

JON W. DUDAS
*Director of the United States Patent and Trademark Office*